United States Patent
Nguyen et al.

(10) Patent No.: US 11,943,668 B2
(45) Date of Patent: *Mar. 26, 2024

(54) PRE-RESERVATION RESOURCE MANAGEMENT

(71) Applicant: QUALCOMM Incorporated, San Diego, CA (US)

(72) Inventors: Tien Viet Nguyen, Bridgewater, NJ (US); Sudhir Kumar Baghel, Pleasanton, CA (US); Arjun Bharadwaj, Cupertino, CA (US); Kapil Gulati, Belle Mead, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/861,846

(22) Filed: Jul. 11, 2022

(65) Prior Publication Data
US 2022/0345946 A1    Oct. 27, 2022

Related U.S. Application Data

(63) Continuation of application No. 16/735,490, filed on Jan. 6, 2020, now Pat. No. 11,388,632.
(Continued)

(51) Int. Cl.
*H04W 28/26*    (2009.01)
*H04L 47/11*    (2022.01)
(Continued)

(52) U.S. Cl.
CPC ............ *H04W 28/26* (2013.01); *H04L 47/11* (2013.01); *H04L 47/2433* (2013.01);
(Continued)

(58) Field of Classification Search
None
See application file for complete search history.

(56) References Cited

U.S. PATENT DOCUMENTS

| | | | |
|---|---|---|---|
| 9,591,509 B2 * | 3/2017 | Guan | H04W 4/70 |
| 10,206,235 B2 * | 2/2019 | Martin | H04W 72/04 |

(Continued)

FOREIGN PATENT DOCUMENTS

| | | |
|---|---|---|
| CN | 108696935 A | 10/2018 |
| CN | 110073630 A | 7/2019 |
| WO | WO-2018111516 A1 | 6/2018 |

OTHER PUBLICATIONS

Ebert J.P., et al., "Analyzing the RTS/CTS Mechanism; 1195182_scan", IEEE Draft 1195182—Scan, IEEE-SA, Piscataway, NJ USA, vol. 802.11, Jan. 2, 2015 (Jan. 2, 2015), pp. 1-10, XP068085520, [retrieved on Jan. 2, 2015], paragraph [0001], paragraph [0003].

(Continued)

*Primary Examiner* — Eunsook Choi
(74) *Attorney, Agent, or Firm* — Holland & Hart LLP

(57) ABSTRACT

Methods, systems, and devices for wireless communications are described. A device may determine a packet for transmission and determine whether to transmit a reservation signal prior to the transmission of the packet based in part on a condition. The condition may include, but is not limited to, a packet size, or a packet priority, or a combination thereof. According to the determination, the device may refrain from transmitting the reservation signal or allocate resources for the reservation signal from a same resource pool associated with the transmission of the packet or a dedicated resource pool according to a pre-reservation resource pattern.

38 Claims, 12 Drawing Sheets

Related U.S. Application Data

(60) Provisional application No. 62/791,024, filed on Jan. 10, 2019.

(51) Int. Cl.
  *H04L 47/2425* (2022.01)
  *H04L 47/70* (2022.01)
  *H04W 8/04* (2009.01)
  *H04W 72/566* (2023.01)

(52) U.S. Cl.
  CPC .............. *H04L 47/70* (2013.01); *H04W 8/04* (2013.01); *H04W 72/569* (2023.01)

(56) References Cited

U.S. PATENT DOCUMENTS

| | | | |
|---|---|---|---|
| 10,779,320 B2 | 9/2020 | Sun et al. | |
| 11,006,446 B2* | 5/2021 | Gulati | H04W 72/20 |
| 11,039,474 B2* | 6/2021 | Cui | H04W 74/0816 |
| 2014/0169212 A1* | 6/2014 | Villasenor | H04W 24/02 |
| | | | 370/254 |
| 2015/0334745 A1* | 11/2015 | Zhao | H04W 74/02 |
| | | | 370/252 |
| 2016/0127947 A1 | 5/2016 | Bhanage et al. | |
| 2016/0174225 A1* | 6/2016 | Patil | H04W 40/246 |
| | | | 370/329 |
| 2017/0272345 A1* | 9/2017 | Viorel | H04W 74/0816 |
| 2017/0273017 A1* | 9/2017 | Gidvani | H04W 24/10 |
| 2017/0331577 A1* | 11/2017 | Parkvall | H04J 11/0079 |
| 2019/0320465 A1* | 10/2019 | Wu | H04W 74/0816 |
| 2020/0112972 A1* | 4/2020 | Nguyen | H04W 74/0808 |
| 2020/0187056 A1* | 6/2020 | Yang | H04W 80/02 |
| 2020/0229041 A1 | 7/2020 | Nguyen et al. | |

OTHER PUBLICATIONS

International Preliminary Report on Patentability—PCT/US2020/012556, The International Bureau of WIPO—Geneva, Switzerland, dated Jul. 22, 2021.
International Search Report and Written Opinion—PCT/US2020/012556—ISA/EPO—dated Mar. 19, 2020.
Orfanos G., et al., "A Centralized MAC Protocol with QoS Support for Wireless LANs", IEEE International Symposium on Personal, Indoor and Mobile Radio Communications, PIMRC, IEEE, PI, XX, Sep. 1, 2007 (Sep. 1, 2007), 5 pages, XP031168598, ISBN: 978-1-4244-1143-6, p. 2-p. 3, figures 1,3, figures 1.4.

* cited by examiner

PRE-RESERVATION RESOURCE MANAGEMENT

CROSS REFERENCE

The present application for patent is a Continuation of U.S. patent application Ser. No. 16/735,490 by Nguyen et al., entitled "PRE-RESERVATION RESOURCE MANAGEMENT" filed Jan. 6, 2020, which claims the benefit of U.S. Provisional Patent Application No. 62/791,024 by Nguyen et al., entitled "PRE-RESERVATION RESOURCE MANAGEMENT," filed Jan. 10, 2019, assigned to the assignee hereof, and expressly incorporated herein.

INTRODUCTION

The following relates to wireless communications, and more specifically to managing resources for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support direct communications between wireless communications devices (e.g., direct communications between multiple UEs). Examples of direct communications may include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like. Some wireless communications systems that support direct communications may transmit a reservation signal, prior to a packet transmission, to one or more additional wireless communications devices in a wireless communications system. The reservation signal may provide an indication to the one or more additional wireless communications devices of reserved resources for the packet transmission. As a result, any wireless communication device that receives the reservation signal may refrain from using resources that overlap with reserved resources.

SUMMARY

A method of wireless communications at device in a wireless communications system is described. The method may include determining a packet for transmission, determining whether to transmit a reservation signal prior to the transmission of the packet based on a condition, the reservation signal reserving resources for the transmission of the packet, and the reservation signal sharing resources from a same resource pool as the resources for the transmission of the packet, and refraining from transmitting the reservation signal based on determining whether to transmit the reservation signal prior to the transmission of the packet.

An apparatus for wireless communications a wireless communications system is described. The apparatus may include a processor, memory coupled to the processor, and the processor and memory configured to determine a packet for transmission, determine whether to transmit a reservation signal prior to the transmission of the packet based on a condition, the reservation signal reserving resources for the transmission of the packet, and the reservation signal sharing resources from a same resource pool as the resources for the transmission of the packet, and refrain from transmitting the reservation signal based on determining whether to transmit the reservation signal prior to the transmission of the packet.

Another apparatus for wireless communications in a wireless communications system is described. The apparatus may include means for determining a packet for transmission, determining whether to transmit a reservation signal prior to the transmission of the packet based on a condition, the reservation signal reserving resources for the transmission of the packet, and the reservation signal sharing resources from a same resource pool as the resources for the transmission of the packet, and refraining from transmitting the reservation signal based on determining whether to transmit the reservation signal prior to the transmission of the packet.

A non-transitory computer-readable medium storing code for wireless communications at device in a wireless communications system is described. The code may include instructions executable by a processor to determine a packet for transmission, determine whether to transmit a reservation signal prior to the transmission of the packet based on a condition, the reservation signal reserving resources for the transmission of the packet, and the reservation signal sharing resources from a same resource pool as the resources for the transmission of the packet, and refrain from transmitting the reservation signal based on determining whether to transmit the reservation signal prior to the transmission of the packet.

Some examples of the method, apparatuses, and non-transitory computer-readable medium described herein may further include operations, features, means, or instructions for determining a congestion level related to traffic load in the wireless communications system, where the congestion level may be based on a resource unavailability, a packet size, or a packet priority, or a combination thereof, and monitoring a packet drop ratio by the device in the wireless communications system, where the packet drop ratio may be based on a resource unavailability, a packet size, or a packet priority, or a combination thereof, where refraining from transmitting the reservation signal may be based on the congestion level or the packet drop ratio, or a combination thereof.

Some examples of the method, apparatuses, and non-transitory computer-readable medium described herein may further include operations, features, means, or instructions for determining that the congestion level or the packet drop ratio, or both, satisfy a threshold, and disabling the transmission of the reservation signal prior to the transmission of the packet based on the congestion level or the packet drop ratio, or both, satisfying the threshold, where refraining from transmitting the reservation signal may be based on the disabling.

A method of wireless communications at device in a wireless communications system is described. The method may include determining whether to transmit a reservation signal prior to a transmission of a packet based on a condition and allocating, based on the determining, resources for the reservation signal from a same resource pool associated with the transmission of the packet or a dedicated resource pool according to a pre-reservation resource pattern, the reservation signal reserving one or more resources for the transmission of the packet.

An apparatus for wireless communications at device in a wireless communications system is described. The apparatus may include a processor, memory coupled to the processor, and the processor and memory configured to determine whether to transmit a reservation signal prior to a transmission of a packet based on a condition and allocate, based on the determining, resources for the reservation signal from a same resource pool associated with the transmission of the packet or a dedicated resource pool according to a pre-reservation resource pattern, the reservation signal reserving one or more resources for the transmission of the packet.

Another apparatus for wireless communications at device in a wireless communications system is described. The apparatus may include means for determining whether to transmit a reservation signal prior to a transmission of a packet based on a condition and allocating, based on the determining, resources for the reservation signal from a same resource pool associated with the transmission of the packet or a dedicated resource pool according to a pre-reservation resource pattern, the reservation signal reserving one or more resources for the transmission of the packet.

A non-transitory computer-readable medium storing code for wireless communications at device in a wireless communications system is described. The code may include instructions executable by a processor to determine whether to transmit a reservation signal prior to a transmission of a packet based on a condition and allocate, based on the determining, resources for the reservation signal from a same resource pool associated with the transmission of the packet or a dedicated resource pool according to a pre-reservation resource pattern, the reservation signal reserving one or more resources for the transmission of the packet.

Some examples of the method, apparatuses, and non-transitory computer-readable medium described herein may further include operations, features, means, or instructions for determining a first set of available resources during a transmission time interval, the first set of available resources following the pre-reservation resource pattern or the first set of available resources being from the dedicated resource pool, and selecting the first set of available resources to transmit the reservation signal during the transmission time interval and prior to the transmission of the packet.

Some examples of the method, apparatuses, and non-transitory computer-readable medium described herein may further include operations, features, means, or instructions for determining a second set of available resource during the transmission time interval or a subsequent transmission time interval, reserving the second set of available resources for the transmission of the packet, and including, in the reservation signal, information associated with the second set of available resources for the transmission of the packet.

Some examples of the method, apparatuses, and non-transitory computer-readable medium described herein may further include operations, features, means, or instructions for determining an absence of available resources during a transmission time interval, determining available resources during a subsequent transmission time interval, the available resources following the pre-reservation resource pattern, and the available resources being from the dedicated resource pool, and selecting the available resources to transmit the reservation signal during the transmission time interval and prior to the transmission of the packet.

Some examples of the method, apparatuses, and non-transitory computer-readable medium described herein may further include operations, features, means, or instructions for determining a second set of available resource during the transmission time interval or a subsequent transmission time interval, reserving the second set of available resources for the transmission of the packet, and including, in the reservation signal, information associated with the second set of available resources for the transmission of the packet.

Some examples of the method, apparatuses, and non-transitory computer-readable medium described herein may further include operations, features, means, or instructions for determining a congestion level related to traffic load in the wireless communications system, where the congestion level may be based on a resource unavailability, a packet size, or a packet priority, or a combination thereof, and monitoring a packet drop ratio by the device in the wireless communications system, where the packet drop ratio may be based on the resource unavailability, the packet size, or the packet priority, or a combination thereof.

Some examples of the method, apparatuses, and non-transitory computer-readable medium described herein may further include operations, features, means, or instructions for mapping the congestion level to a congestion index value in a table including a set of congestion index values, where each congestion index value correlates to a packet size, a Quality-of-Service (QoS) requirement, a packet priority, or a combination thereof, determining to enable the reservation signal based on the congestion index value, and transmitting the reservation signal based on enabling the reservation signal.

Some examples of the method, apparatuses, and non-transitory computer-readable medium described herein may further include operations, features, means, or instructions for mapping the congestion level to a congestion index value in a table including a set of congestion index values, where each congestion index value correlates to a packet size, a QoS requirement, a packet priority, or a combination thereof, determining to disable the reservation signal based on the congestion index value, and refraining from transmitting the reservation signal based on disabling the reservation signal.

Some examples of the method, apparatuses, and non-transitory computer-readable medium described herein may further include operations, features, means, or instructions for determining to perform the transmission of the packet using resources from the dedicated resource pool based on disabling the reservation signal, where the dedicated resource pool includes one or more resources dedicated for pre-reservation associated with the reservation signal.

Some examples of the method, apparatuses, and non-transitory computer-readable medium described herein may further include operations, features, means, or instructions for determining that the congestion level or the packet drop ratio, or both, may be below a first threshold, and refraining from allocating one or more resources for the transmission of the packet from the dedicated resource pool associated with the reservation signal based at least in part on the congestion level or the packet drop ratio, or both, being below the first threshold.

Some examples of the method, apparatuses, and non-transitory computer-readable medium described herein may further include operations, features, means, or instructions for determining that the congestion level or the packet drop ratio, or both, may be above a first threshold and below a second threshold, and allocating resources for the transmission of the packet from the dedicated resource pool associated with the reservation signal based on the congestion level or the packet drop ratio, or both, being above the first threshold and below the second threshold, where the allocated resources may be reserved based on a reservation signal or a preceding transmission.

Some examples of the method, apparatuses, and non-transitory computer-readable medium described herein may further include operations, features, means, or instructions for determining that the congestion level or the packet drop ratio, or both, may be above a first threshold, and allocating resources for the transmission of the packet from the dedicated resource pool associated with the reservation signal based on the congestion level or the packet drop ratio, or both, being above the first threshold.

DETAILED DESCRIPTION

Figure 1:
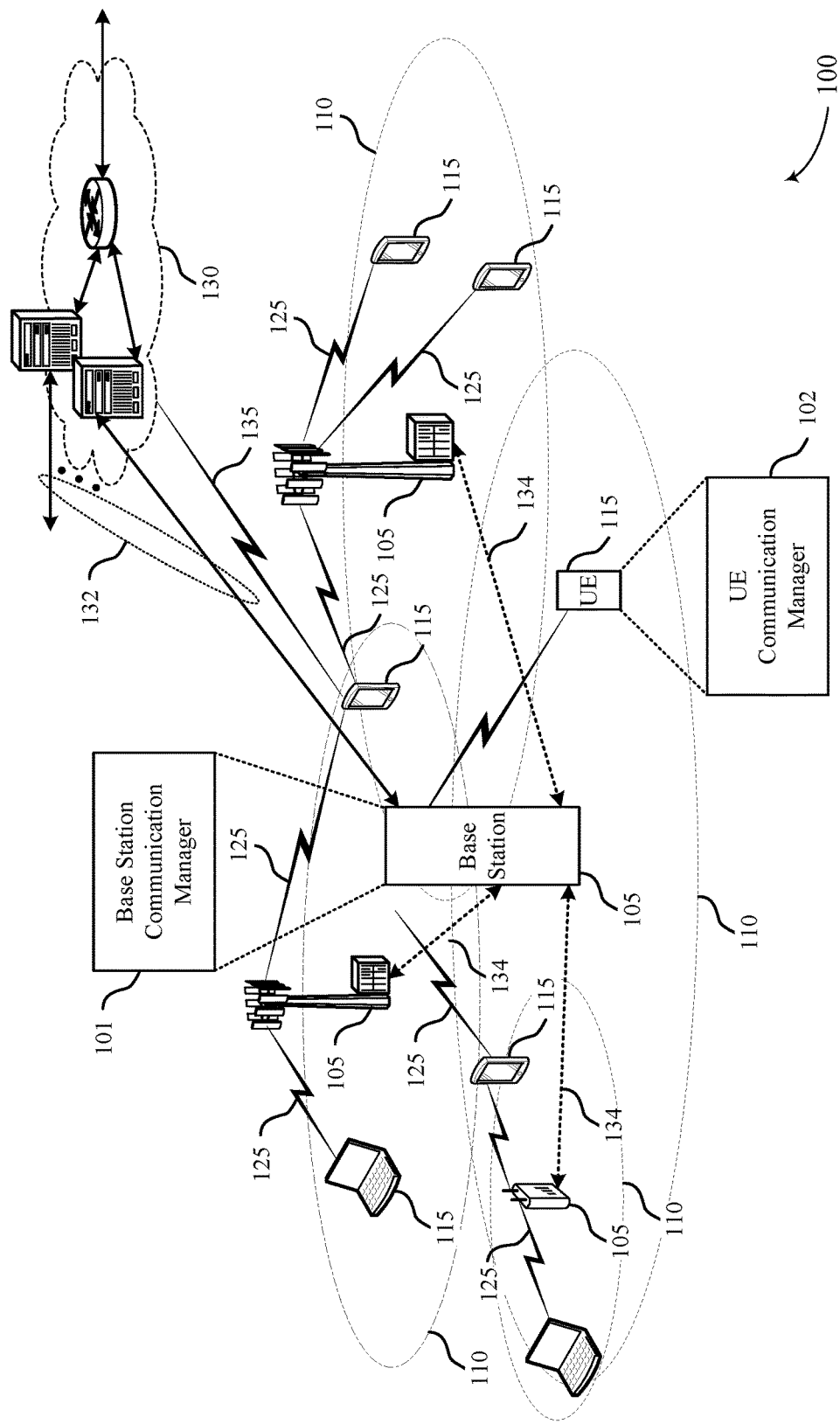
FIGS. 1 and 2 illustrate examples of a wireless communications system that supports pre-reservation resource management for wireless communications in accordance with one or more aspects of the present disclosure.

Transmission of a reservation signal may be in accordance to a packet size. Although transmission of a reservation signal may reduce interference in wireless communications systems, there may be occasions where resource allocation related to reservation signals is wasted. For example, when a packet transmission is below a packet size threshold, the wireless communications device may determine to refrain from transmitting a reservation signal. That is, because a reservation signal may have a fixed overhead (e.g., resource allocation) per packet transmission, there may be occasions where resources may be unused. As a result, wireless communications devices may experience inefficient management of resources related to reservation signaling.

The described techniques relate to improved methods, systems, devices, and apparatuses that support pre-reservation resource management. The described techniques may enable a wireless communications device in a wireless communications system that supports in-direct or direct communications between wireless communications devices (e.g., direct communications between multiple UEs), such as a D2D system, a V2X system (or other systems such as V2V networks, C-V2X networks), and the like to reliably determine when to transmit a reservation signal and select resources for the reservation signal using resources either from a same resource pool as resources for normal packet transmission or in a dedicated pool.

A reservation signal may be a short transmission that reserves the resource for one or many subsequent data transmissions. These special transmissions require a small amount of time and frequency resources (e.g., a resource block, a slot, a transmission time interval, etc.) that may be sent separately ahead of the main data transmissions. The present disclosure addresses managing resources used for reservation signals in coexistence with the resource pool used for normal data transmissions. This may be achieved by having UEs select resources for transmitting reservation signals from a shared resource pool. The shared resource pool may be related to resources allocated, reserved, and selected for packet transmissions (e.g., normal traffic). In another aspect, a separated resource pool may be dedicated for the transmission of reservation signals. In some cases, the resources dedicated for reservation signals may include unoccupied resources (e.g., when the reservation signals do not occupy all of the resources dedicated for the reservation signals). Accordingly, in some example implementations of the techniques described herein, UEs may use the unoccupied resources of the resources dedicated for reservation signals for their own transmissions (e.g., data transmissions), which may result in more efficient use of resources.

Aspects of the disclosure are initially described in the context of wireless communications systems. Aspects are then described with respect to a process flow that supports pre-reservation resource management. Aspects of the disclosure are further illustrated by and described with reference to apparatus diagrams, system diagrams, and flowcharts that relate to pre-reservation resource management for wireless communications.

FIG. 1 illustrates an example of a wireless communications system 100 that supports pre-reservation resource management in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to determine (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for determining a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval. In other cases, a smallest scheduling unit of the wireless communications system 100 may be shorter than a subframe or may be dynamically selected (e.g., in bursts of shortened transmission time intervals) or in selected component carriers using shortened transmission time intervals).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to transmission time intervals or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. The wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter transmission time interval duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A transmission time interval in eCC may consist of one or multiple symbol periods. In some cases, the transmission time interval duration (that is, the number of symbol periods in a transmission time interval) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications system 100, such as a V2X system (or other systems such as V2V networks, C-V2X networks, and the like), wireless communications devices may perform pre-reservation resource management. These wireless communications devices may be examples of UEs 115. For example, a UE 115 may support direct communications with other UEs 115, and may transmit a reservation signal, prior to a packet transmission, to UEs 115 in the wireless communications system 100. A reservation signal may also be referred to herein as a pre-reservation signal. The reservation signal may provide an indication to the UEs 115 in the wireless communications system 100 of reserved resources for the packet transmission. As a result, any UE 115 that may be within a threshold range (e.g., distance) that receives the reservation signal may refrain from using resources that overlap with the reserved resources of the packet transmission.

A reservation signal may consume a small amount of time and frequency resources (e.g., a resource block, a slot, a transmission time interval, etc.). That is, a reservation signal may have a dedicated (e.g., a fixed) resource pool for selecting resources for transmission of the reservation signal. In some examples, UEs 115 may determine whether to transmit a reservation signal based in part on a parameter (e.g., a packet size, a packet priority, and the like). Therefore, in some examples, UEs 115 may refrain from transmitting a reservation signal when one or more packets for a packet transmission are below a packet size, a packet priority, and the like. In this example, UEs 115 may experience inefficient management of resources (e.g., wasted resources) related to reservation signaling because resources allocated for reservation signaling may go unused. By way of example, if a fixed resource pool is allocated for reservation signaling (e.g., transmission of a reservation signal), the allocated pool will be wasted when transmissions from UEs 115 is low (e.g., low traffic) or congested when transmissions from UEs 115 is high (e.g., high traffic). In some examples, overall resources for UEs 115 in the wireless communications system 100 may also be fragmented.

To address challenges related to pre-reservation resource management, such as inefficiencies, among others, UEs 115 may select resources for transmitting reservation signals from a shared resource pool. The shared resource pool may be related to resources allocated, reserved, and selected for packet transmissions (e.g., normal traffic). As a result, UEs 115 in the wireless communications system 100 may benefit from improved efficiency and reduced latency associated with processes related to scheduling resources for packet transmission or packet re-transmission because UEs 115 may use resources otherwise dedicated largely for reservation signaling. In addition, selecting resources for transmitting reservation signals from a shared resource pool may not have any adverse properties on normal packet transmissions since they may use limited resources. For example, each reservation signal may occupy one transmission time interval and less than one subchannel. In this example, one subchannel may be capable of fitting multiple nonoverlapping reservation signals. Therefore, each UE 115 searching to transmit a reservation signal may search for a subchannel and a transmission time interval (e.g., 1 subchannel by 1 transmission time interval) resource that is non-overlapping with any reserved resources (e.g., of other reservation signals associated with other UEs 115, or packet transmissions of other UEs 115). The UEs 115 may then select a resource location (e.g., a resource block) randomly within the subchannel and the transmission time interval resource.

One or more of the base stations 105 may include a base station communication manager 101, which may support distance based resource exclusion. UEs 115 may include a UE communication manager 102, which may support distance based resource exclusion. For example, a UE communication manager 102 may determine a packet for transmission, determine whether to transmit a reservation signal prior to the transmission of the packet based in part on a condition, the reservation signal reserving resources for the transmission of the packet, and the reservation signal sharing resources from a same resource pool as the resources for the transmission of the packet, and refraining from transmitting the reservation signal based in part on determining whether to transmit the reservation signal prior to the transmission of the packet based in part on the condition. The UE communication manager 102 may additionally, or alternatively, determine to transmit a reservation signal prior to a transmission of a packet based in part on a condition, allocate resources for the reservation signal from a same resource pool associated with the transmission of the packet or a dedicated resource pool based in part on a pre-reservation resource pattern, the reservation signal reserving one or more resources for the transmission of the packet, and determine whether to transmit the reservation signal using the allocated resources. The pre-reservation resource pattern may be a pattern of resource block locations where reservation signals can start. A dedicated resource pool may also be referred to herein as one or more resources dedicated for pre-reservation (e.g., a reservation signal).

Accordingly, pre-reservation resource management may provide benefits and enhancements to the operation of UEs 115. For example, by enabling UEs 115 to reliably determine when to transmit a reservation signal and select resources for the reservation signal using resources from a same resource pool as resources for normal packet transmission, operational characteristics, such as power consumption, processor utilization, and memory usage related to packet transmission may be reduced. The pre-reservation resource management may also provide efficiency to UEs 115 by reducing latency associated with processes related to scheduling resources for packet transmission or packet re-transmission, and more specifically avoiding unexploited resources in the wireless communications system 100. For example, UEs 115 may improve latency when packet transmissions can be transmitted directly with a reservation signal, or improve reliability when there is pre-reservation and the packet transmission is protected from interference.

Figure 2:
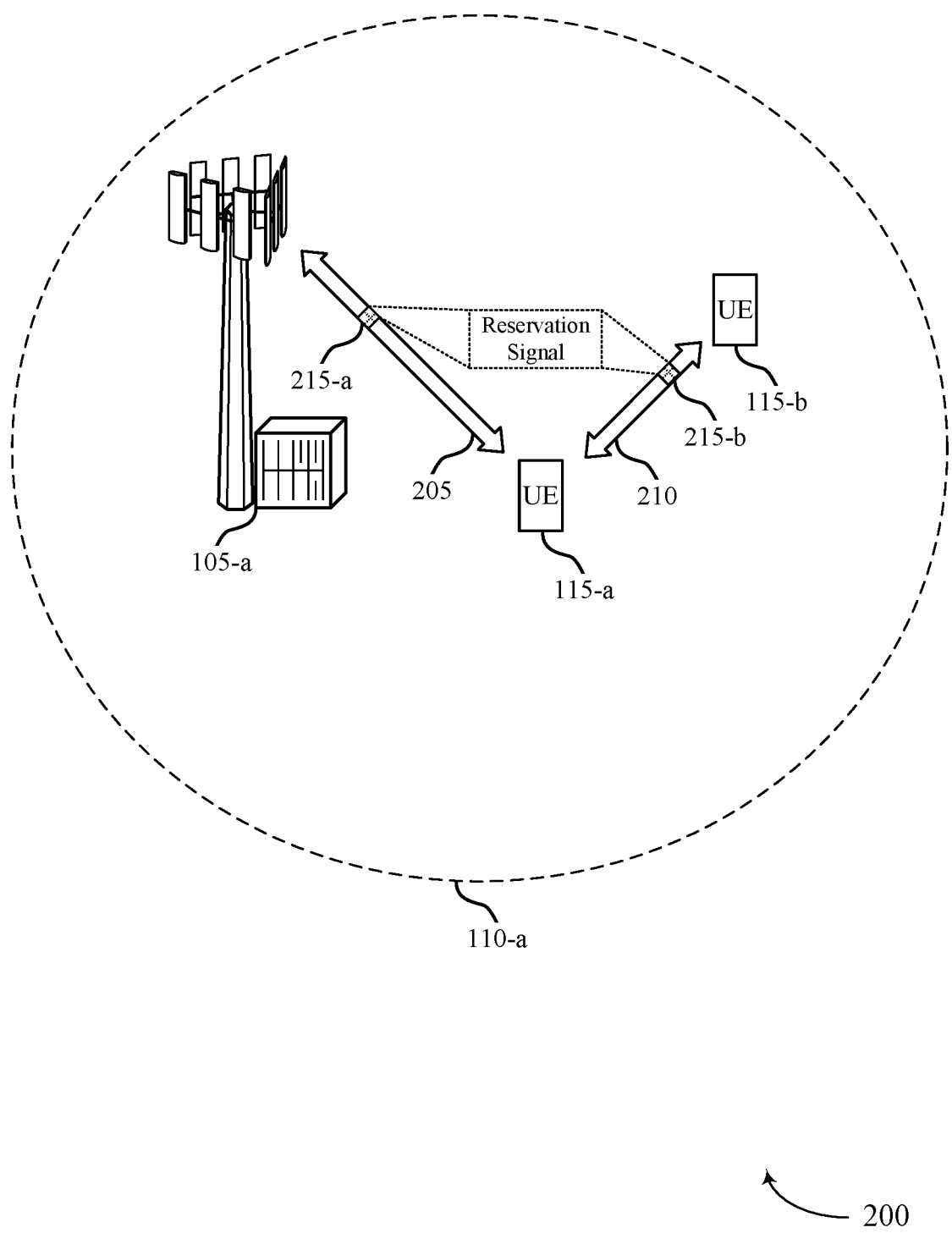

FIG. 2 illustrates an example of a wireless communications system 200 that supports pre-reservation resource management for wireless communications in accordance with one or more aspects of the present disclosure. The wireless communications system 200 may include a base station 105-a, a UE 115-a, and a UE 115-b, which may be examples of the corresponding devices described with reference to FIG. 1. In some examples, the wireless communications system 200 may implement aspects of the wireless communications system 100. For example, the wireless communications system 200 may enable the UE 115-a and the UE 115-b to reliably determine when to transmit a reservation signal and reserve resources for the reservation signal using resources from a same resource pool as resources for normal packet transmission. As a result, the UE 115-a and the UE 115-b may experience improved efficiency by reducing latency associated with processes related to scheduling resources for packet transmission or packet re-transmission, and more specifically avoiding unexploited resources in the wireless communications system 200.

In some examples the wireless communications system 200 may be a 4G systems such as LTE systems, LTE-A systems, or LTE-A Pro systems, and 5G systems which may be referred to as NR systems. In this example, base station 105-a may perform a connection procedure (e.g., an RRC procedure, such as a cell acquisition procedure, a random access procedure, an RRC connection procedure, an RRC configuration procedure) with the UE 115-a, and establish a communication link 205. Base station 105-a may provide communication coverage for a respective geographic coverage area 110-a. In other examples, the wireless communications system 200 may additionally, or alternatively, support direct communications (e.g., between multiple UEs). Examples of direct communications may include, but are not limited to, D2D communications, vehicle-based communications, which may also be referred to as V2X networks, V2V networks, C-V2X networks, and the like. In this example, UE 115-*a* may establish a communication link 210 via direct communications (e.g., D2D) with the UE 115-*b*. The UE 115-*a* may transmit reservation signals as well as packet transmissions to the base station 105-*a* and the UE 115-*b* via communications links 205, 210.

A UE 115-*a* may determine a packet for transmission. For example, UE 115-*a* may have one or more packets for transmission to base station 105-*a*, UE 115-*b*, or one or more other UEs (not shown). Prior to transmission of the packet, UE 115-*a* may determine whether to transmit reservation signal(s) 215-*a*, 215-*b*. This determination may be based in part on a condition. For example, a condition may be a congestion level. In some examples, UE 115-*a* may enable or disable reservation signaling according to a congestion level associated with the wireless communications system 200. A congestion level may be per packet. For example, a congestion level may be based in part on a packet size, a priority of a packet, a number of available resources for reservation signaling, a number of reserved resources by other UEs, a number of reserved resources for a packet, a reliability requirement of a packet (e.g., a QoS), a number of re-transmissions of a packet, or a combination thereof. UE 115-*a* may therefore enable or disable reservation signaling based in part on the congestion level being below (or equal to) or above a threshold. For example, if a congestion level associated with the wireless communications system 200 is equal to or below a threshold, UE 115-*a* may enable reservation signaling. Otherwise, if the congestion level is (equal to) or above the threshold, UE 115-*a* may disable reservation signaling.

In further examples, a congestion level may be based in part on a traffic load in the wireless communications system 200. As such, when a traffic load is high (e.g., above a threshold), transmission of the reservation signal(s) 215-*a*, 215-*b* may further affect the traffic load of the wireless communications system 200. Because transmission of the reservation signal(s) 215-*a*, 215-*b* may be performed via a number of narrow band transmissions, the reservation signal(s) 215-*a*, 215-*b* may fragment consecutive blocks of resources, which can otherwise be used for normal packet transmissions. To improve pre-reservation resource management in the wireless communications system 200, the UE 115-*a* (and/or the UE 115-*b*) may be configured to enable or disable reservation signaling.

Additionally, or alternatively, UE 115-*a* may enable or disable reservation signaling according to a packet drop ratio. For example, if a packet drop ratio is equal to or above a threshold, UE 115-*a* may disable reservation signaling. Otherwise, UE 115-*a* may enable the reservation signaling. UE 115-*a* may also monitor and determine a packet drop ratio based in part on a packet size, a priority of a packet, a number of available resources for reservation signaling, a number of reserved resources by other UEs, a number of reserved resources for a packet, a reliability requirement of a packet (e.g., a QoS), a number of re-transmissions of a packet, or a combination thereof. In some examples, UE 115-*a* may be configured to continuously have reservation signaling enabled or disabled irrespective of a congestion level or a packet drop ratio associated with the wireless communications system 200.

Returning to the congestion level examples, UE 115-*a* may also determine a congestion index value according to a determined congestion level. For example, UE 115-*a* may map a determined congestion level (e.g., based in part on a resource unavailability, a packet size, or a packet priority, and the like) to a congestion index value in a relational database, a bitmap, a table, or the like, that has a set of congestion index values. A relational database, a bitmap, a table, or the like may provide an indication to UE 115-*a* on whether to enable or disable reservation signaling based in part on a congestion index value. For example, a first congestion level determined by UE 115-*a* for a first packet (e.g., based in part on a resource unavailability, a packet size, or a packet priority, and the like) may map to a first congestion index value, which may indicate to UE 115-*a* to enable reservation signaling for the first packet. In another example, a second congestion level determined by UE 115-*a* for a second packet (e.g., based in part on a resource unavailability, a packet size, or a packet priority, and the like) may map to a second congestion index value, which may indicate to UE 115-*a* to disable reservation signaling for the second packet.

In some examples, the relational database, a bitmap, a table, or the like may be configured to indicate enabling or disabling reservation signaling when a congestion level is within a congestion level range. For example, the relational database, a bitmap, a table, or the like may be configured with a set of congestion level ranges (e.g., a first range including a first set of congestion index values, a second range including a second set of congestion index values, and the like). In this example, a determined congestion level mapped by the UE 115-*a* to a congestion index value that is within a range may coincide with whether the UE 115-*a* enables or disables reservation signaling.

After UE 115-*a* determines to enable reservation signaling (e.g., that UE 115-*a* may proceed with transmitting reservation signal(s) 215-*a*, 215-*b*), UE 115-*a* may determine (e.g., identify) and select resources (e.g., time and frequency resources) for the reservation signaling. To address standing challenges related to pre-reservation resource management, such as inefficiencies, among others, UE 115-*a* may determine and select resources for reservation signaling from a shared resource pool. The shared resource pool may be related to resources allocated, reserved, and selected for packet transmissions (e.g., normal traffic) for UE 115-*a* or one or more other UEs 115 (e.g., UE 115-*b*). As a result, UE 115-*a* may benefit from improved efficiency and reduced latency associated with processes related to scheduling resources for packet transmission or packet re-transmission because UE 115-*a* may use resources originally dedicated largely for reservation signaling (when reservation signaling is disabled). In addition, selecting resources for reservation signaling from a shared resource pool may not have any adverse properties on packet transmissions (e.g., normal traffic) since reservation signaling use fewer resources compared to packet transmissions. UE 115-*a* may subsequently select one or more resources for future data transmissions. Selection of the one or more resources for a future data transmission may occur after a resource for pre-reservation has been identified. This prevents the possibility of a resource being stale by the time UE 115-*a* performs the data transmission. That is, there may be an occasion that by the time the resource for pre-reservation is identified, the selected one or more resources for the data transmission may have become stale because another UE (e.g., UE 115-*b*) may have already claimed those resources.

In some examples, because each reservation signal may occupy one transmission time interval and less than one subchannel, to reduce (receiver) complexity for blind-decoding reservation signaling, resource selection for reservation signaling may be bound to at most one subchannel and one transmission time interval according to a pre-reservation resource pattern. In the wireless communications system 200, UE 115-*a* (and UE 115-*b*) may be configured with resource (start) positions (e.g., resource block locations). For example, UE 115-*a* may determine a resource start position for resource allocation of reservation signaling according to a resource allocation map (e.g., a bitmap). Therefore if resource blocks coinciding to the resource start position for resource allocation of reservation signaling is unavailable, UE 115-*a* may buffer and select resources for resource allocation for the reservation signaling in a subsequent resource (e.g., a subsequent slot or transmission time interval).

In some examples, the pre-reservation resource pattern may hop from slot to slot to provide a randomness for reservation signaling. Thereby by having UE 115-*a* subsequently select one or more resources for future data transmissions. Selection of the one or more resources for a future data transmission may occur after a resource for pre-reservation has been identified. This prevents the possibility of a resource being stale by the time UE 115-*a* performs the data transmission. That is, there may be an occasion that by the time the resource for pre-reservation is identified, the selected one or more resources for the data transmission may have become stale because another UE (e.g., UE 115-*b*) may have already claimed those resources. UE 115-*a* may be configured with the pre-reservation resource pattern or a network device (e.g., base station 105-*a*) may configure the UE 115-*a* with it. As such, UE 115-*a* may be aware of resource locations to use for reservation signaling. In return, UEs receiving reservation signaling (e.g., UE 115-*b* from UE 115-*a*) may perform blind decoding to detect and receive the reservation signaling according to the configured resource locations. In some examples, UE 115-*a* may use resources reserved for a reservation signal according to the pre-reservation resource pattern for the packet transmission when a congestion level or packet drop ratio satisfies a threshold (e.g., is above a threshold). Otherwise, UE 115-*a* may refrain from using configured resources associated with reservation signaling for packet transmission.

By way of example, UE 115-*a* may determine that a congestion level or a packet drop ratio, or both, are below a first threshold, and refrain from allocating resources for the packet transmission from resources dedicated to the reservation signal in the shared (or dedicated) resource pool, based in part on the congestion level or the packet drop ratio, or both, being below the first threshold. Alternatively, UE 115-*a* may determine that the congestion level or the packet drop ratio, or both, are above the first threshold, and allocate resources for the packet transmission from resources dedicated to the reservation signal in the shared (or dedicated) resource pool. In further examples, UE 115-*a* may determine that a congestion level or a packet drop ratio, or both, are above a first threshold and below a second threshold, and allocate resources for packet transmission from resources dedicated to the reservation signal in the shared (or dedicated) resource pool. In this example, the allocated resources may be reserved based in part on a reservation signal or a preceding transmission. For example, UE 115-*a* may determine and select a set of available resources during a transmission time interval for transmitting the reservation signals 215-*a*, 215-*b*, the set of available resources may follow the pre-reservation resource pattern or may be from a shared (or dedicated) resource pool. Additionally, UE 115-*a* may determine and reserve a set of available resources during a same or different transmission time interval for the packet transmission, the set of available resources may also follow the pre-reservation resource pattern or may be from a shared (or dedicated) resource pool. UE 115-*a* may transmit one or more packets to base station 105-*a*, UE 115-*b*, or one or more other UEs (not shown) using the preceding resource reservation scheme.

Hence, pre-reservation resource management in the wireless communications system 200 may provide benefits and enhancements to the operation of UEs 115-*a*, 115-*b*. For example, by enabling UEs 115-*a*, 115-*b* to reliably determine when to transmit a reservation signal and reserve resources for the reservation signal using resources from a same resource pool as resources for normal packet transmission, operational characteristics, such as power consumption, processor utilization, and memory usage related to packet transmission may be reduced. The pre-reservation resource management may also provide efficiency to UEs 115-*a*, 115-*b* by reducing latency associated with processes related to scheduling resources for packet transmission or packet re-transmission, and more specifically avoiding unexploited resources in the wireless communications system 200, by allocating resources for the reservation signal from a same resource pool associated with the transmission of the packet or a dedicated resource pool based at least in part on a pre-reservation resource pattern.

Figure 3:
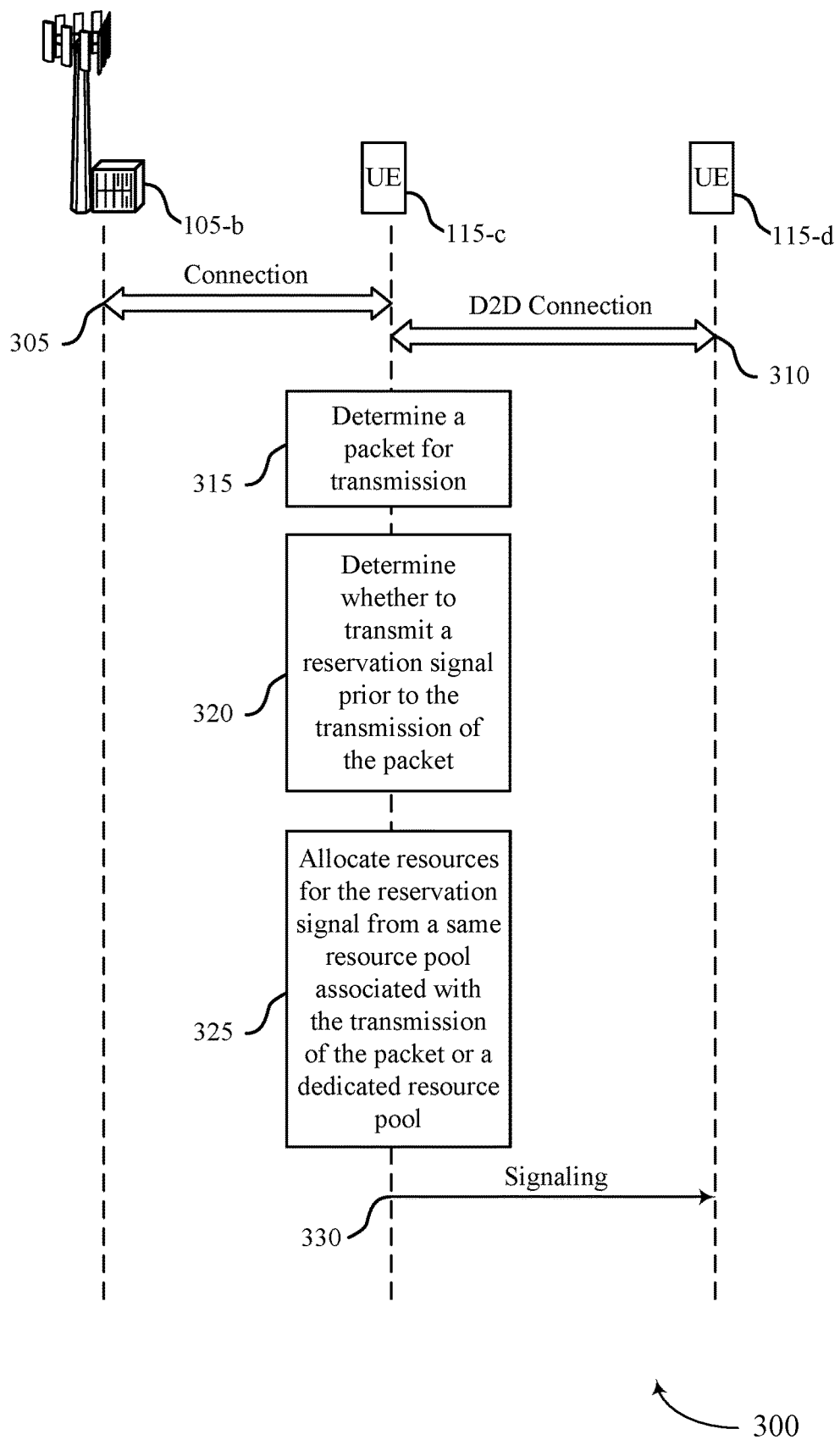
FIG. 3 illustrates an example of a process flow that supports pre-reservation resource management for wireless communications in accordance with one or more aspects of the present disclosure.

FIG. 3 illustrates an example of a process flow 300 that supports pre-reservation resource management for wireless communications in accordance with one or more aspects of the present disclosure. In some examples, the process flow 300 may implement aspects of wireless communications systems 100 or 200. The process flow 300 may include a base station 105-*b*, a UE 115-*c*, and a UE 115-*d*, which may be examples of the corresponding devices described with reference to FIGS. 1 and 2. For example, process flow 300 may enable the UE 115-*c* to reliably determine when to transmit a reservation signal and reserve resources for the reservation signal using resources from a same resource pool as resources for normal packet transmission. As a result, the UE 115-*c* may experience improved efficiency by reducing latency associated with processes related to scheduling resources for packet transmission or packet re-transmission.

In the following description of the process flow 300, the operations between the base station 105-*b*, the UE 115-*c*, and the UE 115-*d* may be transmitted in a different order than the exemplary order shown, or the operations performed by the base station 105-*b*, the UE 115-*c*, and the UE 115-*d* may be performed in different orders or at different times. Certain operations may also be omitted from the process flow 300, and/or other operations may be added to the process flow 300.

At 305, the process flow 300 may (optionally) commence with the base station 105-*b* and the UE 115-*c* performing a connection procedure (e.g., an RRC procedure, such as a cell acquisition procedure, random access procedure, an RRC connection procedure, an RRC (re-configuration procedure) to establish a wired or wireless connection. At 310, the process flow 300 may (optionally) commence with the UE 115-*c* and the UE 115-*d* performing a connection procedure to establish direction communication. Examples of direct communications may include, but are not limited to, D2D communications, vehicle-based communications, which may also be referred to as V2X networks, V2V networks, C-V2X networks, and the like.

At 315, the UE 115-*c* may determine a packet for transmission. At 320, the UE 115-*c* may determine whether to transmit a reservation signal prior to the transmission of the packet. For example, to improve pre-reservation resource management, the UE 115-*c* may be configured to enable or disable reservation signaling. In some examples, UE 115-*a* may enable or disable reservation signaling according to a congestion level, which may be based in part on a packet size, a priority of a packet, a number of available resources for reservation signaling, a number of reserved resources by other UEs, a number of reserved resources for a packet, a reliability requirement of a packet (e.g., a QoS), a number of re-transmissions of a packet, or a combination thereof. UE 115-c may therefore enable or disable reservation signaling based in part on the congestion level being below (or equal to) or above a threshold. For example, if a congestion level is equal to or below a threshold, UE 115-c may enable reservation signaling. Otherwise, if the congestion level is (equal to) or above the threshold, UE 115-c may disable reservation signaling.

At 325, UE 115-c may allocate resources for the reservation signal from a same resource pool associated with the transmission of the packet or a dedicated resource pool (e.g., for reservation signaling). For example, UE 115-c may determine a set of available resources during a transmission time interval, the set of available resources following a resource pattern or the set of available resources being from the dedicated resource pool (or shared resource pool). At 330, the UE 115-c may transmit signaling including the reservation signal. For example, the UE 115-c transmit a reservation signal to the UE 115-d via direct communications (e.g., D2D).

Therefore, the present disclosure may provide improvements to pre-reservation resource management. Furthermore, the techniques described herein may provide benefits and enhancements to the operation of the UEs 115-c, 115-d. For example, by enabling UEs 115-c, 115-d to reliably determine when to transmit a reservation signal and select resources for the reservation signal using resources from a same resource pool as resources for normal packet transmission, operational characteristics, such as power consumption, processor utilization, etc. related to packet transmission may be reduced. The pre-reservation resource management may also provide efficiency to UEs 115-c, 115-d by reducing latency associated with processes related to scheduling resources for packet transmission or packet re-transmission, and more specifically avoiding unexploited resources in the wireless communications system by allocating resources for the reservation signal from a same resource pool associated with the transmission of the packet or a dedicated resource pool based at least in part on a pre-reservation resource pattern. For example, UEs 115 may improve latency when packet transmissions can be transmitted directly with a reservation signal, or improve reliability when there is pre-reservation and the packet transmission is protected from interference.

Figure 4:
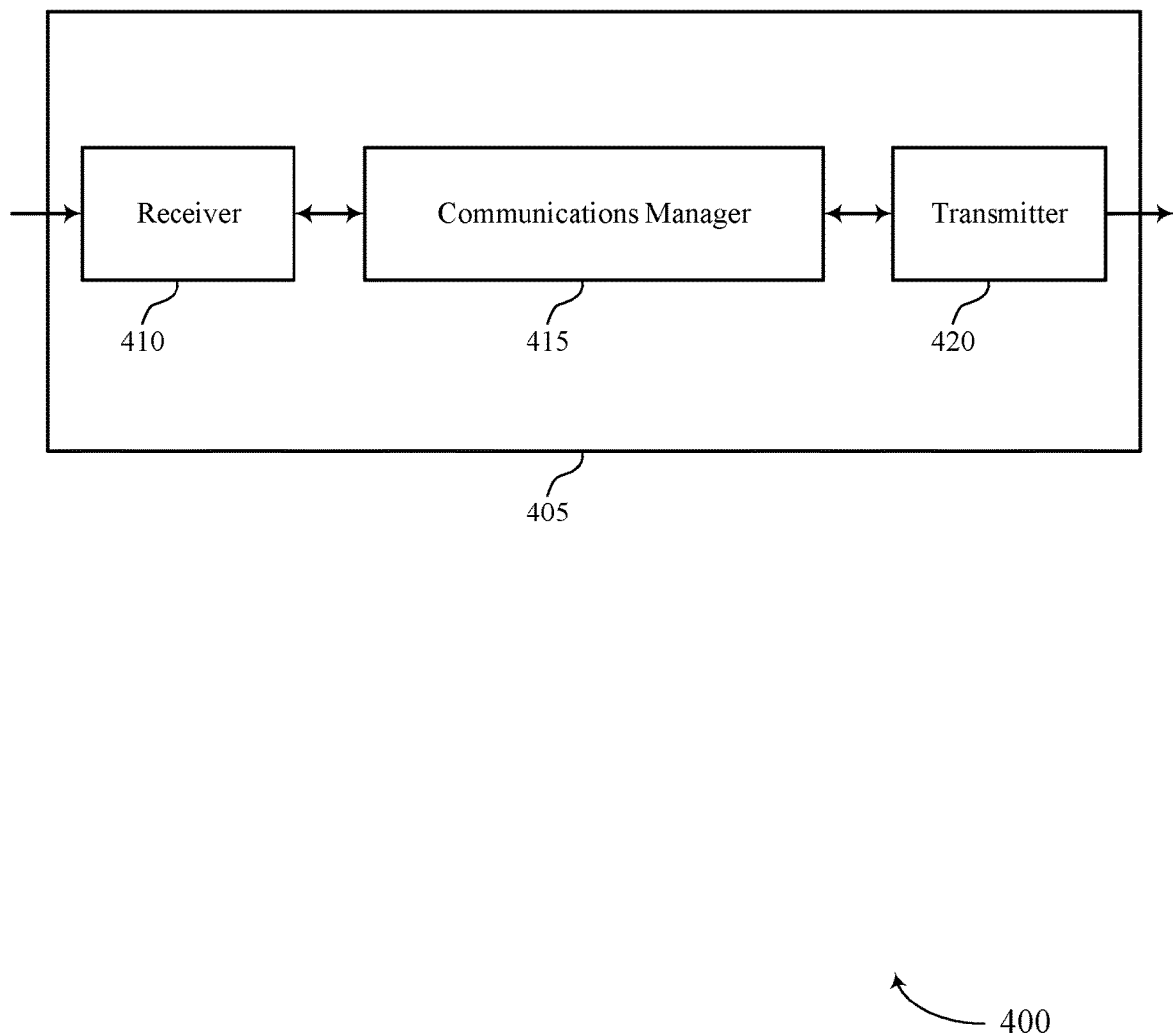
FIGS. 4 and 5 show block diagrams of devices that support pre-reservation resource management in accordance with one or more aspects of the present disclosure.

FIG. 4 shows a block diagram 400 of a device 405 that supports pre-reservation resource management in accordance with one or more aspects of the present disclosure. The device 405 may be an example of aspects of a device as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to pre-reservation resource management, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine a packet for transmission, determine whether to transmit a reservation signal prior to the transmission of the packet based on a condition, the reservation signal reserving resources for the transmission of the packet, and the reservation signal sharing resources from a same resource pool as the resources for the transmission of the packet, and refrain from transmitting the reservation signal based on determining whether to transmit the reservation signal prior to the transmission of the packet based on the condition. The communications manager 415 may also determine whether to transmit a reservation signal prior to a transmission of a packet based on a condition and allocate, based on the determining, resources for the reservation signal from a same resource pool associated with the transmission of the packet or a dedicated resource pool according to a pre-reservation resource pattern, the reservation signal reserving one or more resources for the transmission of the packet. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device to transmit a packet directly with a reservation signal or use a pre-reservation signal to protect a packet from interference, which may result in increased processing efficiency as the device 405 may improve latency in some cases while avoiding potentially necessary retransmissions with a pre-reservation signal in other cases. Based on techniques for efficiently exploiting potential resources in the wireless communications system as described herein, a processor of a UE 115 (e.g., controlling the receiver 410, the transmitter 420, or a transceiver 720 as described with respect to FIG. 7) may increase system efficiency and decrease unnecessary processing at a device, which may result in increased power savings and longer battery life.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
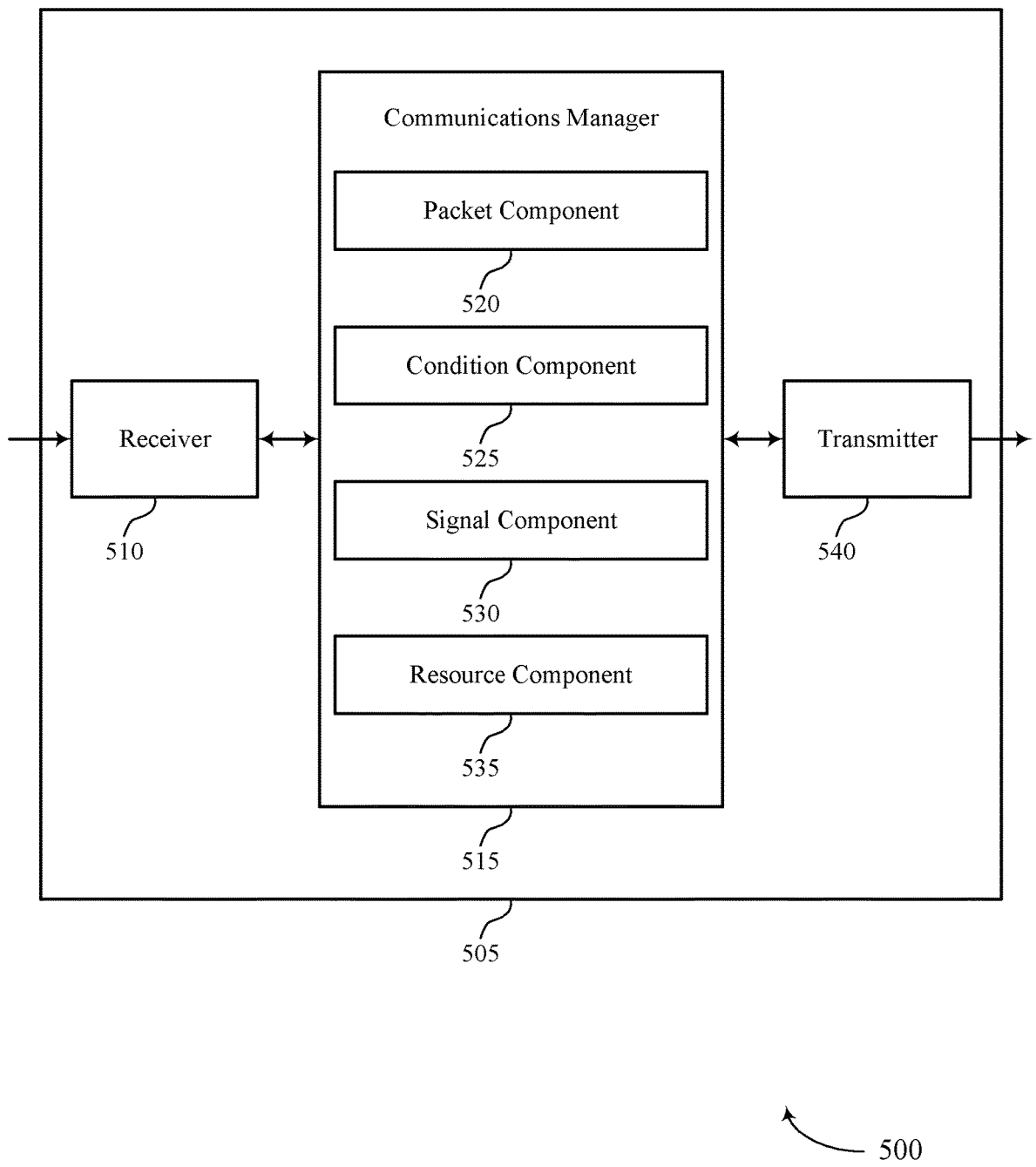

FIG. 5 shows a block diagram 500 of a device 505 that supports pre-reservation resource management in accordance with one or more aspects of the present disclosure. The device 505 may be an example of aspects of a device 405 or a device 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to pre-reservation resource management, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a packet component 520, a condition component 525, a signal component 530, and a resource component 535. The communications manager 515 may be an example of aspects of the communications manager 710 described herein.

The packet component 520 may determine a packet for transmission. The condition component 525 may determine whether to transmit a reservation signal prior to the transmission of the packet based on a condition, the reservation signal reserving resources for the transmission of the packet, and the reservation signal sharing resources from a same resource pool as the resources for the transmission of the packet. The signal component 530 may refrain from transmitting the reservation signal based on determining whether to transmit the reservation signal prior to the transmission of the packet based on the condition. The condition component 525 may determine whether to transmit a reservation signal prior to a transmission of a packet based on a condition. The resource component 535 may allocate, based on the determining, resources for the reservation signal from a same resource pool associated with the transmission of the packet or a dedicated resource pool according to a pre-reservation resource pattern, the reservation signal reserving one or more resources for the transmission of the packet.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
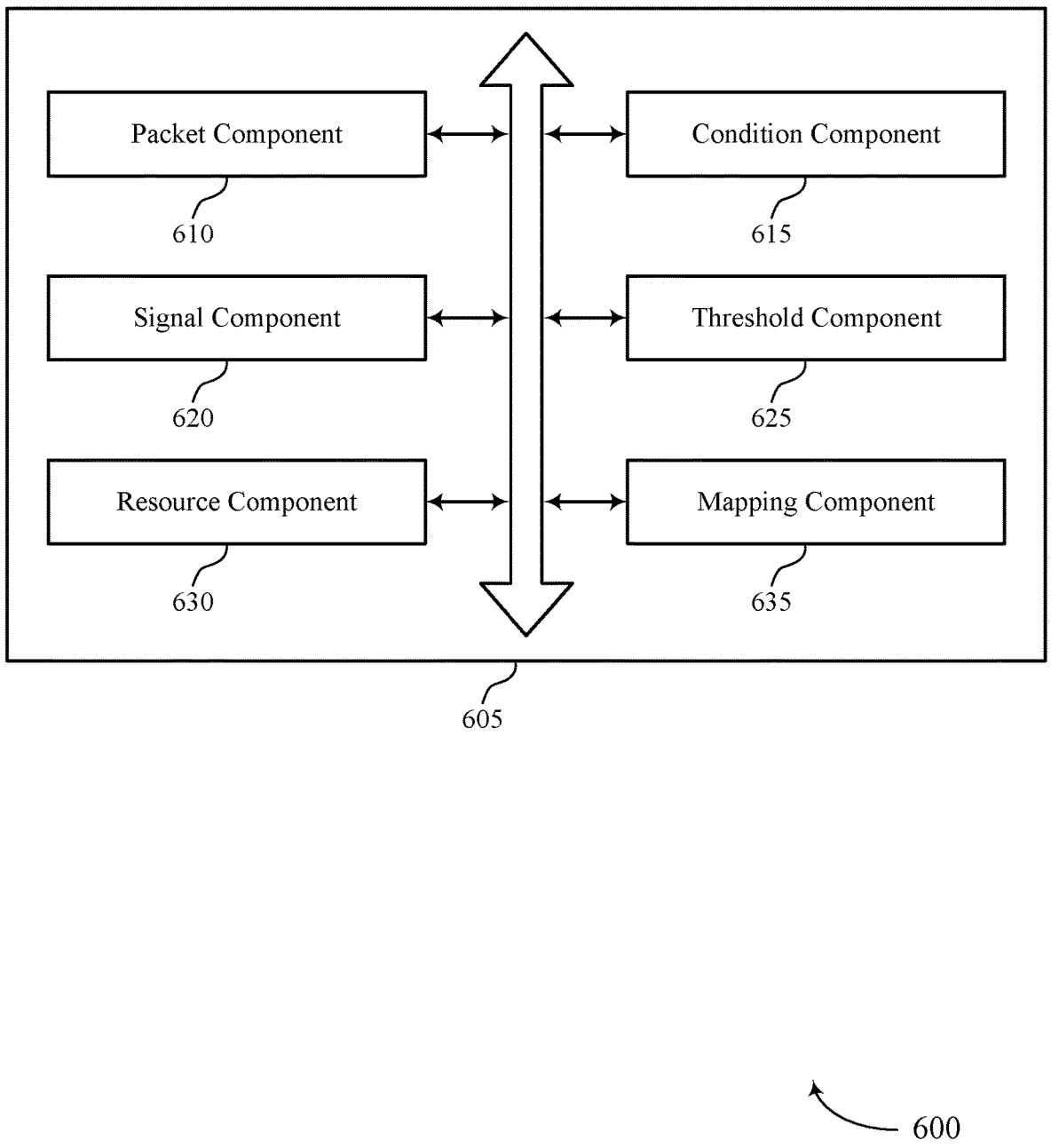
FIG. 6 shows a block diagram of a communications manager that supports pre-reservation resource management in accordance with one or more aspects of the present disclosure.

FIG. 6 shows a block diagram 600 of a communications manager 605 that supports pre-reservation resource management in accordance with one or more aspects of the present disclosure. The communications manager 605 may be an example of aspects of a communications manager 415, a communications manager 515, or a communications manager 710 described herein. The communications manager 605 may include a packet component 610, a condition component 615, a signal component 620, a threshold component 625, a resource component 630, and a mapping component 635. Each of these modules may communicate, directly or indirectly, with one another (e.g., via one or more buses).

The packet component 610 may determine a packet for transmission. The condition component 615 may determine whether to transmit a reservation signal prior to the transmission of the packet based on a condition, the reservation signal reserving resources for the transmission of the packet, and the reservation signal sharing resources from a same resource pool as the resources for the transmission of the packet. In some examples, the condition component 615 may determine whether to transmit a reservation signal prior to a transmission of a packet based on a condition.

The condition component 615 may determine a congestion level related to traffic load in the wireless communications system, where the congestion level is based on a resource unavailability, a packet size, or a packet priority, or a combination thereof. In some examples, the condition component 615 may monitor a packet drop ratio by the device in the wireless communications system, where the packet drop ratio is based on a resource unavailability, a packet size, or a packet priority, or a combination thereof, where refraining from transmitting the reservation signal is based on the congestion level or the packet drop ratio, or a combination thereof. In some examples, the condition component 615 may determine that the congestion level or the packet drop ratio, or both, are below a first threshold. In some examples, the condition component 615 may determine that the congestion level or the packet drop ratio, or both, are above a first threshold and below a second threshold. In some examples, the condition component 615 may determine that the congestion level or the packet drop ratio, or both, are above a first threshold.

The signal component 620 may refrain from transmitting the reservation signal based on the determining. In some examples, the signal component 620 may disable the transmission of the reservation signal prior to the transmission of the packet based on the congestion level or the packet drop ratio, or both, satisfying the threshold, where refraining from transmitting the reservation signal is based on the disabling. In some examples, the signal component 620 may include, in the reservation signal, information associated with the second set of available resources for the transmission of the packet. In some examples, the signal component 620 may transmit the reservation signal based on enabling the reservation signal. In some examples, the signal component 620 may refrain from transmitting the reservation signal based on disabling the reservation signal. In some examples, the signal component 620 may determine to perform the transmission of the packet using resources from the dedicated resource pool based on disabling the reservation signal.

The resource component 630 may allocate, based on the determining, resources for the reservation signal from a same resource pool associated with the transmission of the packet or a dedicated resource pool according to a pre-reservation resource pattern, the reservation signal reserving one or more resources for the transmission of the packet. In some examples, the resource component 630 may determine a first set of available resources during a transmission time interval, the first set of available resources following the pre-reservation resource pattern or the first set of available resources being from the dedicated resource pool. The resource component 630 may select the first set of available resources to transmit the reservation signal during the transmission time interval and prior to the transmission of the packet. In some examples, the resource component 630 may determine a second set of available resource during the transmission time interval or a subsequent transmission time interval. The resource component 630 may reserve the second set of available resources for the transmission of the packet.

In some examples, the resource component 630 may determine an absence of available resources during a transmission time interval. In some examples, the resource component 630 may determine available resources during a subsequent transmission time interval, the available resources following the pre-reservation resource pattern, and the available resources being from the dedicated resource pool. The resource component 630 may select the available resources to transmit the reservation signal during the transmission time interval and prior to the transmission of the packet. In some examples, the resource component 630 may allocate resources for the transmission of the packet from the dedicated resource pool associated with the reservation signal based on the congestion level or the packet drop ratio, or both, being above the first threshold and below the second threshold, where the allocated resources are reserved based on a reservation signal or a preceding transmission. In some examples, the resource component 630 may allocate resources for the transmission of the packet from the dedicated resource pool associated with the reservation signal based on the congestion level or the packet drop ratio, or both, being above the first threshold.

The threshold component 625 may determine that the congestion level or the packet drop ratio, or both, satisfy a threshold. The mapping component 635 may map the congestion level to a congestion index value in a table including a set of congestion index values, where each congestion index value correlates to a packet size, a QoS requirement, a packet priority, or a combination thereof. In some examples, the mapping component 635 may determine to enable the reservation signal based on the congestion index value. In some examples, the mapping component 635 may determine to disable the reservation signal based on the congestion index value.

Figure 7:
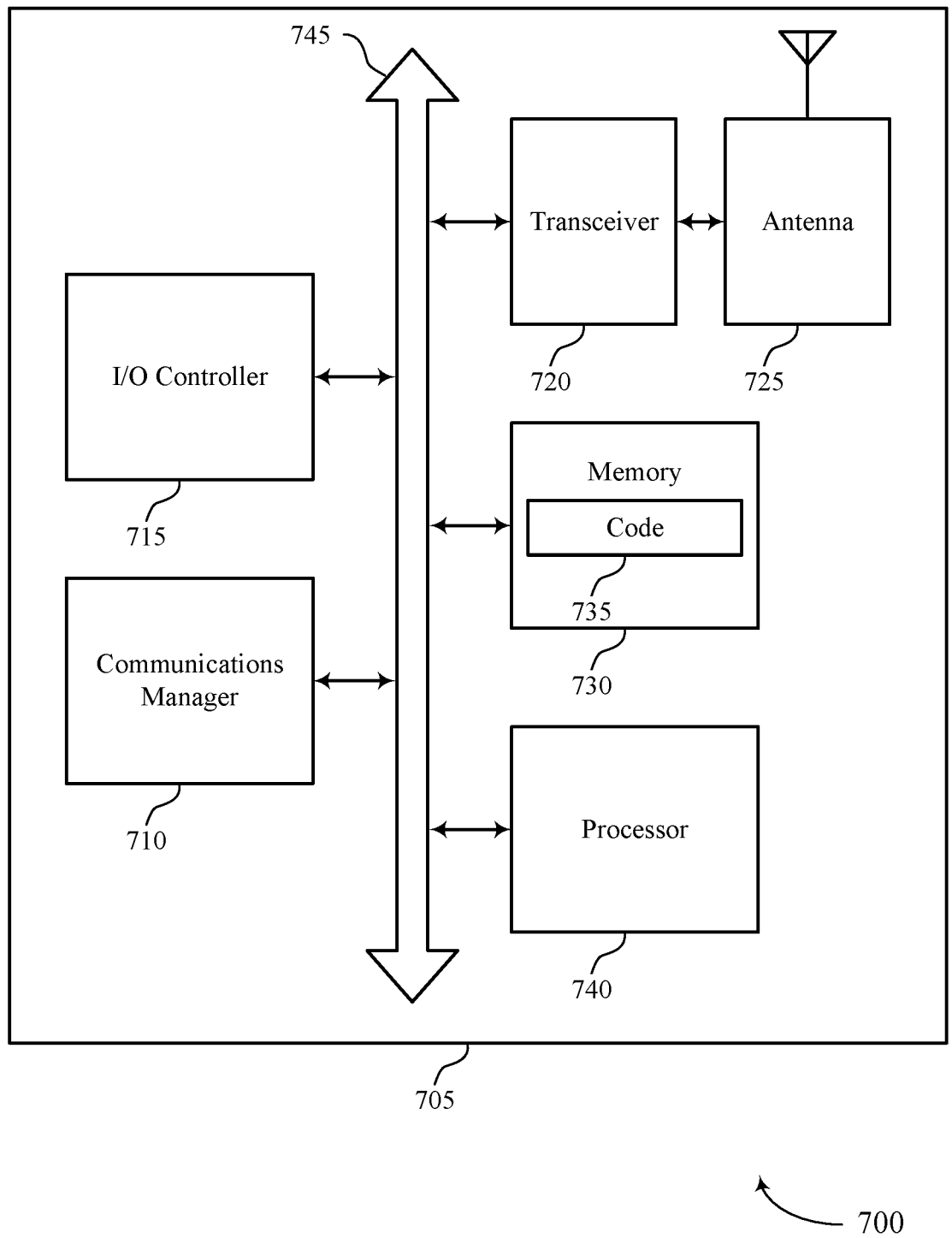
FIG. 7 shows a diagram of a system including a device that supports pre-reservation resource management in accordance with one or more aspects of the present disclosure.

FIG. 7 shows a diagram of a system 700 including a device 705 that supports pre-reservation resource management in accordance with one or more aspects of the present disclosure. The device 705 may be an example of or include the components of device 405, device 505, or a device as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine a packet for transmission, determine whether to transmit a reservation signal prior to the transmission of the packet based on a condition, the reservation signal reserving resources for the transmission of the packet, and the reservation signal sharing resources from a same resource pool as the resources for the transmission of the packet, and refrain from transmitting the reservation signal based on determining whether to transmit the reservation signal prior to the transmission of the packet based on the condition. The communications manager 710 may also determine whether to transmit a reservation signal prior to a transmission of a packet based on a condition and allocate, based on the determining, resources for the reservation signal from a same resource pool associated with the transmission of the packet or a dedicated resource pool according to a pre-reservation resource pattern, the reservation signal reserving one or more resources for the transmission of the packet.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS, ANDROID, MS-DOS, MS-WINDOWS, OS/2, UNIX, LINUX, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices. The code 735 may include instructions to implement aspects of the present disclosure, including instructions to support wireless communications.

The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting pre-reservation resource management).

Figure 8:
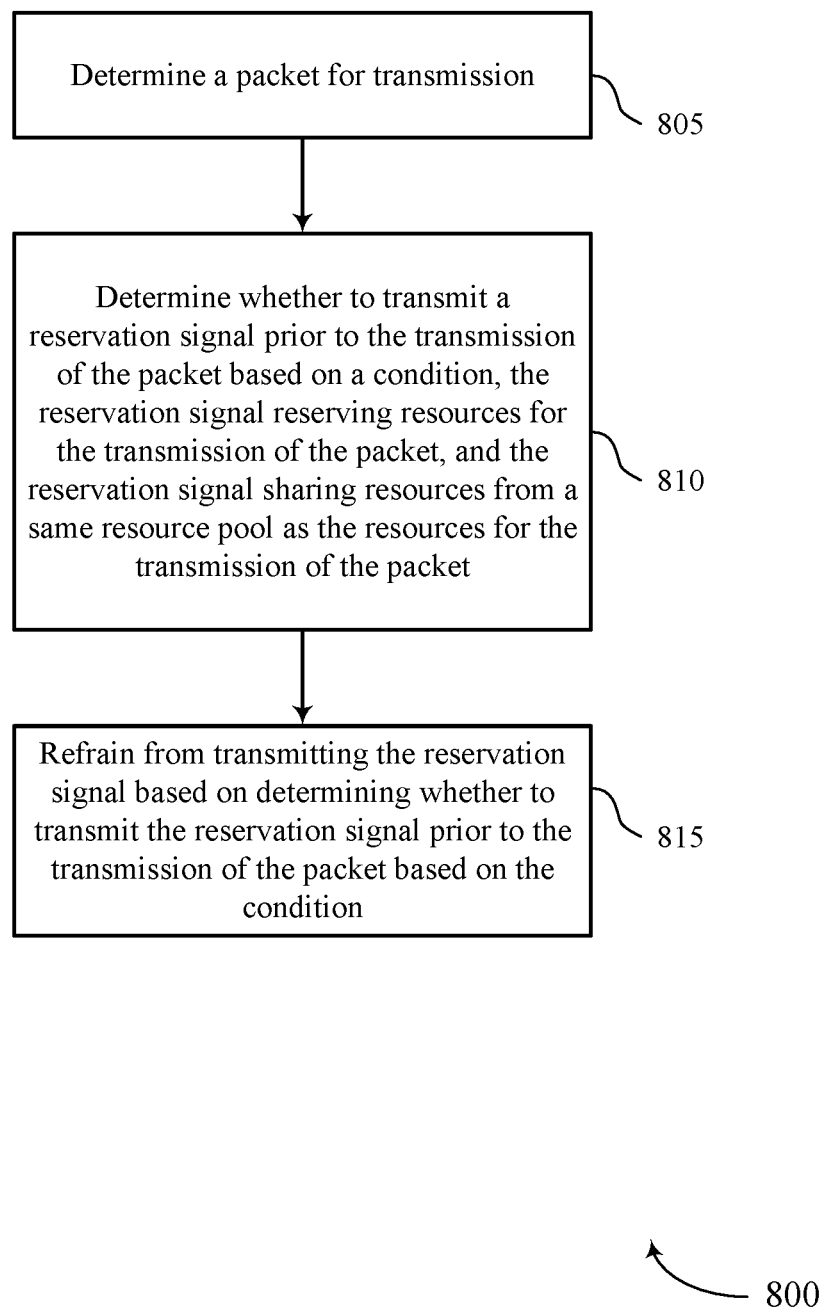
FIGS. 8 through 12 show flowcharts illustrating methods that support pre-reservation resource management in accordance with one or more aspects of the present disclosure.

FIG. 8 shows a flowchart illustrating a method 800 that supports pre-reservation resource management in accordance with one or more aspects of the present disclosure. The operations of method 800 may be implemented by a device or its components as described herein. For example, the operations of method 800 may be performed by a communications manager as described with reference to FIGS. 4 through 7. In some examples, a device may execute a set of instructions to control the functional elements of the device to perform the functions described herein. Additionally or alternatively, a device may perform aspects of the functions described herein using special-purpose hardware.

At 805, the device may determine a packet for transmission. The operations of 805 may be performed according to the methods described herein. In some examples, aspects of the operations of 805 may be performed by a packet component as described with reference to FIGS. 4 through 7.

At 810, the device may determine whether to transmit a reservation signal prior to the transmission of the packet based on a condition, the reservation signal reserving resources for the transmission of the packet, and the reservation signal sharing resources from a same resource pool as the resources for the transmission of the packet. The operations of 810 may be performed according to the methods described herein. In some examples, aspects of the operations of 810 may be performed by a condition component as described with reference to FIGS. 4 through 7.

At 815, the device may refrain from transmitting the reservation signal based on determining whether to transmit the reservation signal prior to the transmission of the packet based on the condition. The operations of 815 may be performed according to the methods described herein. In some examples, aspects of the operations of 815 may be performed by a signal component as described with reference to FIGS. 4 through 7.

Figure 9:
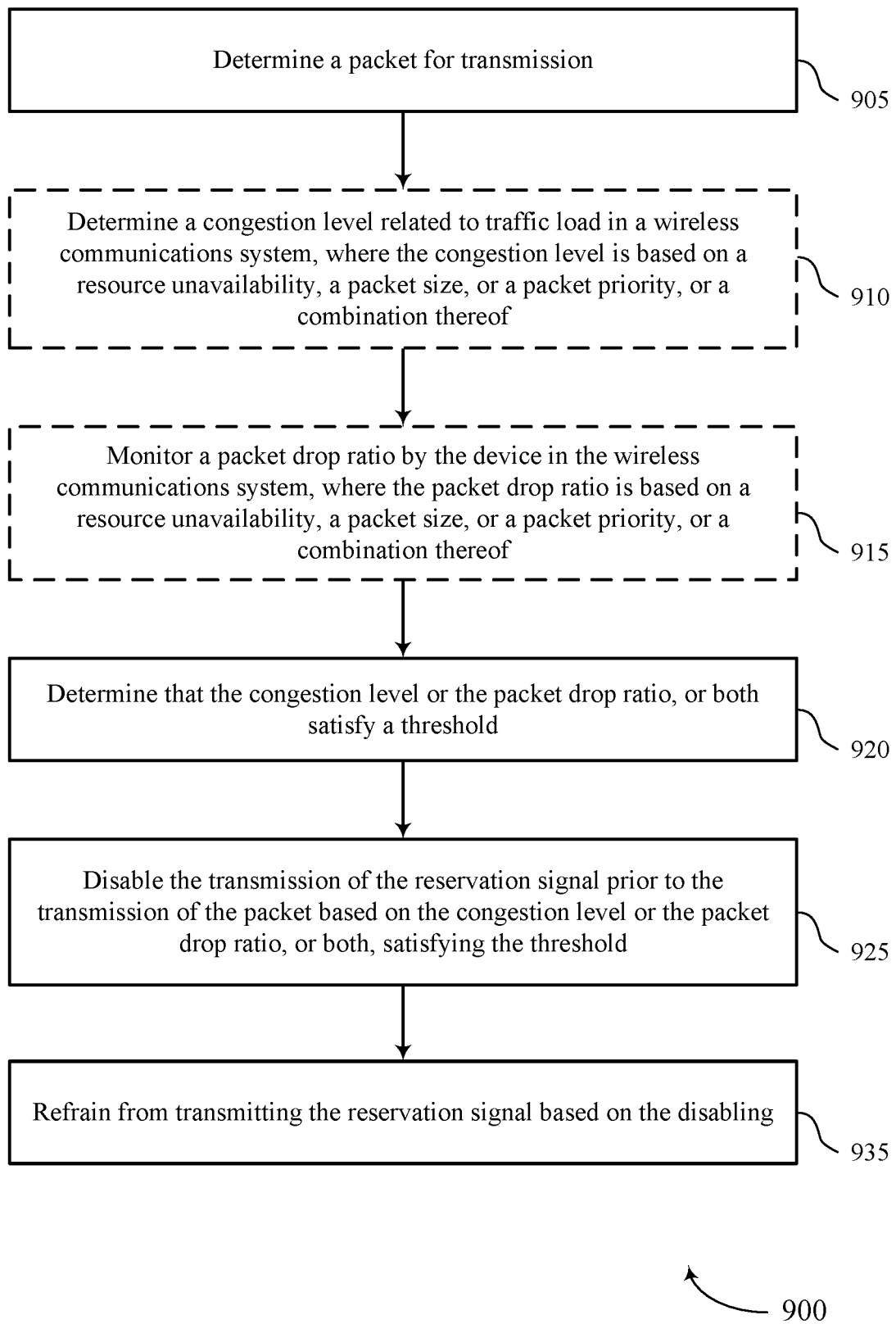

FIG. 9 shows a flowchart illustrating a method 900 that supports pre-reservation resource management in accordance with one or more aspects of the present disclosure. The operations of method 900 may be implemented by a device or its components as described herein. For example, the operations of method 900 may be performed by a communications manager as described with reference to FIGS. 4 through 7. In some examples, a device may execute a set of instructions to control the functional elements of the device to perform the functions described herein. Additionally or alternatively, a device may perform aspects of the functions described herein using special-purpose hardware.

At 905, the device may determine a packet for transmission. The operations of 905 may be performed according to the methods described herein. In some examples, aspects of the operations of 905 may be performed by a packet component as described with reference to FIGS. 4 through 7.

At 910, the device may optionally determine a congestion level related to traffic load in a wireless communications system, where the congestion level is based on a resource unavailability, a packet size, or a packet priority, or a combination thereof. The operations of 910 may be performed according to the methods described herein. In some examples, aspects of the operations of 910 may be performed by a condition component as described with reference to FIGS. 4 through 7.

At 915, the device may optionally monitor a packet drop ratio by the device in the wireless communications system, where the packet drop ratio is based on a resource unavailability, a packet size, or a packet priority, or a combination thereof. The operations of 915 may be performed according to the methods described herein. In some examples, aspects of the operations of 915 may be performed by a condition component as described with reference to FIGS. 4 through 7.

At 920, the device may determine that the congestion level or the packet drop ratio, or both, satisfy a threshold. The operations of 920 may be performed according to the methods described herein. In some examples, aspects of the operations of 920 may be performed by a threshold component as described with reference to FIGS. 4 through 7.

At 925, the device may disable the transmission of the reservation signal prior to the transmission of the packet based on the congestion level or the packet drop ratio, or both, satisfying the threshold. The operations of 925 may be performed according to the methods described herein. In some examples, aspects of the operations of 925 may be performed by a signal component as described with reference to FIGS. 4 through 7.

At 930, the device may refrain from transmitting the reservation signal based on the disabling. The operations of 930 may be performed according to the methods described herein. In some examples, aspects of the operations of 930 may be performed by a signal component as described with reference to FIGS. 4 through 7.

Figure 10:
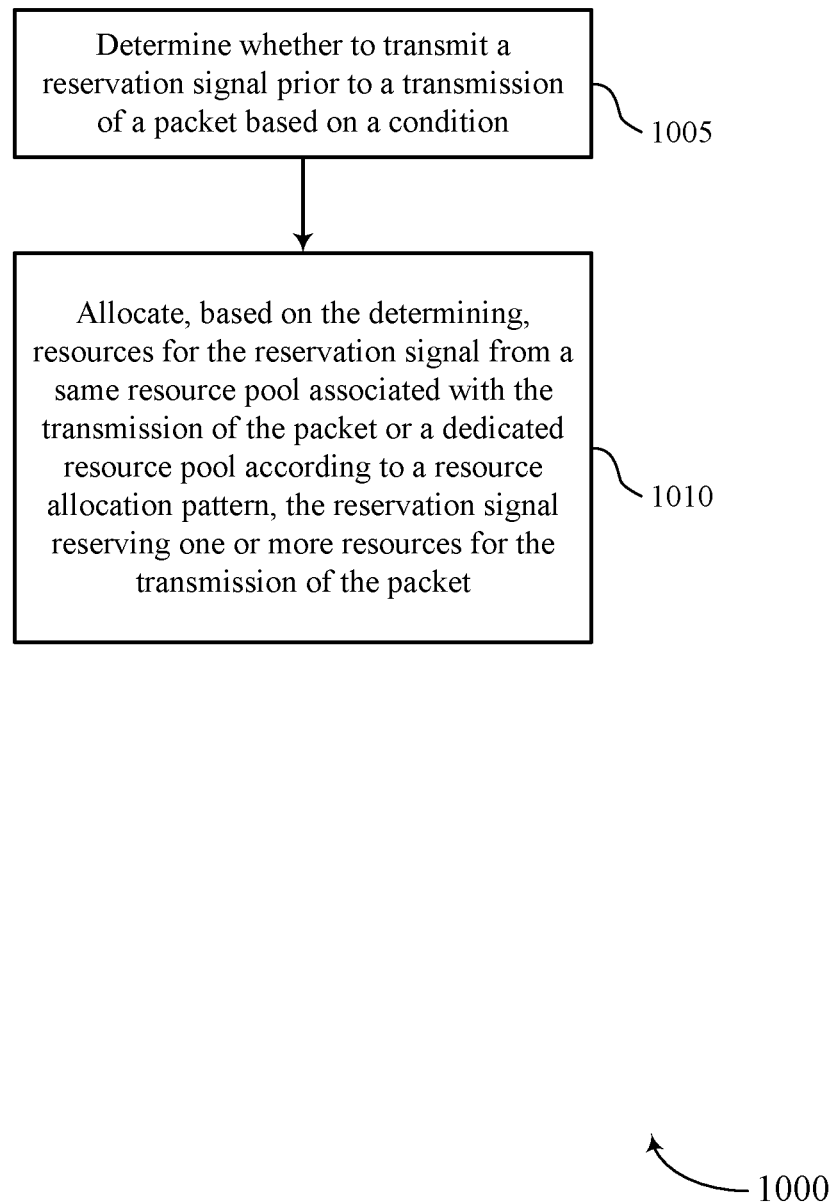

FIG. 10 shows a flowchart illustrating a method 1000 that supports pre-reservation resource management in accordance with one or more aspects of the present disclosure. The operations of method 1000 may be implemented by a device or its components as described herein. For example, the operations of method 1000 may be performed by a communications manager as described with reference to FIGS. 4 through 7. In some examples, a device may execute a set of instructions to control the functional elements of the device to perform the functions described herein. Additionally or alternatively, a device may perform aspects of the functions described herein using special-purpose hardware.

At 1005, the device may determine whether to transmit a reservation signal prior to a transmission of a packet based on a condition. The operations of 1005 may be performed according to the methods described herein. In some examples, aspects of the operations of 1005 may be performed by a condition component as described with reference to FIGS. 4 through 7.

At 1010, the device may allocate, based on the determining, resources for the reservation signal from a same resource pool associated with the transmission of the packet or a dedicated resource pool according to a pre-reservation resource pattern, the reservation signal reserving one or more resources for the transmission of the packet. The operations of 1010 may be performed according to the methods described herein. In some examples, aspects of the operations of 1010 may be performed by a resource component as described with reference to FIGS. 4 through 7.

Figure 11:
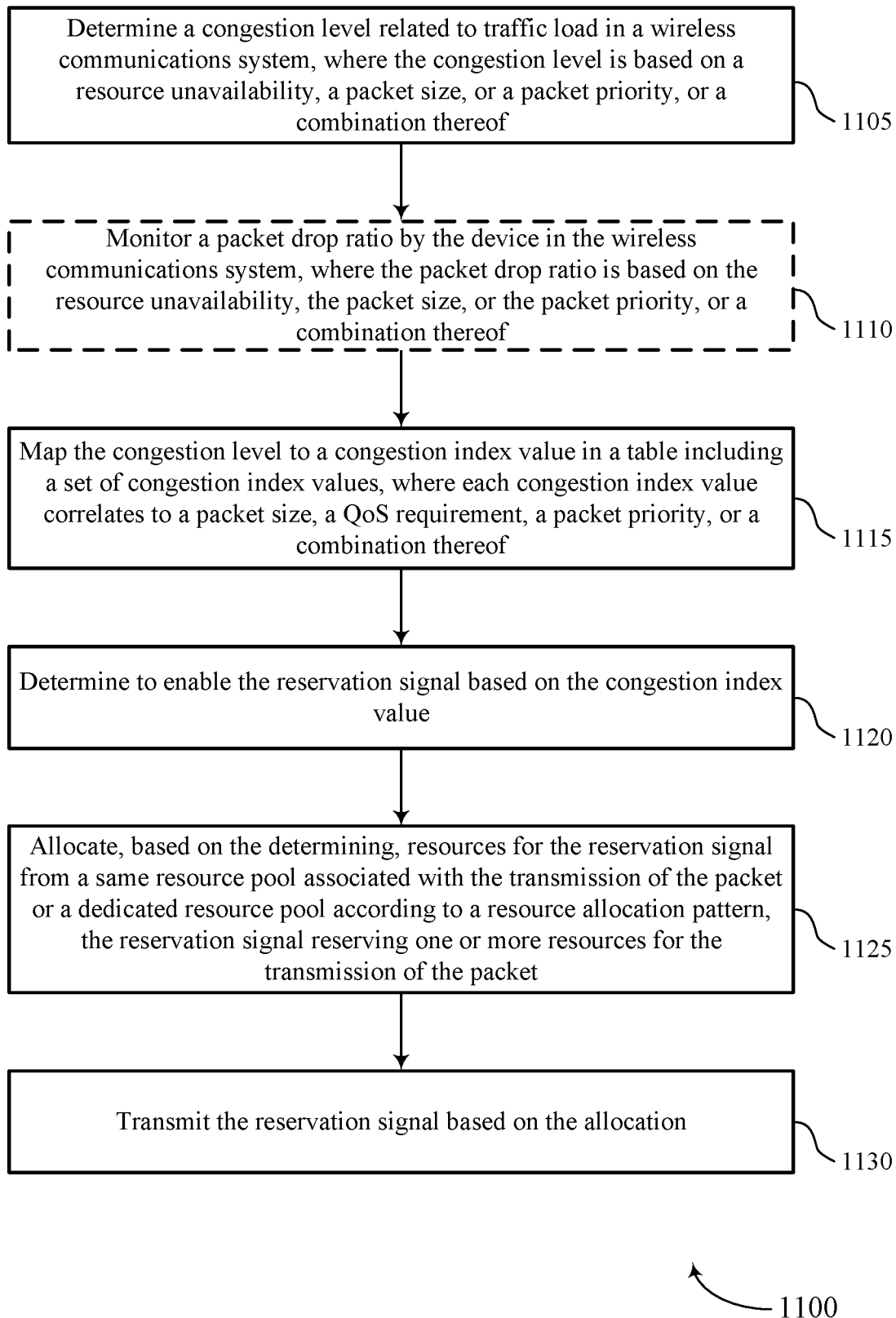

FIG. 11 shows a flowchart illustrating a method 1100 that supports pre-reservation resource management in accordance with one or more aspects of the present disclosure. The operations of method 1100 may be implemented by a device or its components as described herein. For example, the operations of method 1100 may be performed by a communications manager as described with reference to FIGS. 4 through 7. In some examples, a device may execute a set of instructions to control the functional elements of the device to perform the functions described herein. Additionally or alternatively, a device may perform aspects of the functions described herein using special-purpose hardware.

At 1105, the device may determine a congestion level related to traffic load in a wireless communications system, where the congestion level is based on a resource unavailability, a packet size, or a packet priority, or a combination thereof. The operations of 1105 may be performed according to the methods described herein. In some examples, aspects of the operations of 1105 may be performed by a condition component as described with reference to FIGS. 4 through 7.

At 1110, the device may optionally monitor a packet drop ratio by the device in the wireless communications system, where the packet drop ratio is based on the resource unavailability, the packet size, or the packet priority, or a combination thereof. The operations of 1110 may be performed according to the methods described herein. In some examples, aspects of the operations of 1110 may be performed by a condition component as described with reference to FIGS. 4 through 7.

At 1115, the device may map the congestion level to a congestion index value in a table including a set of congestion index values, where each congestion index value correlates to a packet size, a QoS requirement, a packet priority, or a combination thereof. The operations of 1115 may be performed according to the methods described herein. In some examples, aspects of the operations of 1115 may be performed by a mapping component as described with reference to FIGS. 4 through 7.

At 1120, the device may determine to enable the reservation signal based on the congestion index value. The operations of 1120 may be performed according to the methods described herein. In some examples, aspects of the operations of 1120 may be performed by a mapping component as described with reference to FIGS. 4 through 7.

At 1125, the device may allocate, based on the determining, resources for the reservation signal from a same resource pool associated with the transmission of the packet or a dedicated resource pool according to a pre-reservation resource pattern, the reservation signal reserving one or more resources for the transmission of the packet. The operations of 1125 may be performed according to the methods described herein. In some examples, aspects of the operations of 1125 may be performed by a resource component as described with reference to FIGS. 4 through 7.

At 1130, the device may transmit the reservation signal based on the allocation. The operations of 1130 may be performed according to the methods described herein. In some examples, aspects of the operations of 1130 may be performed by a signal component as described with reference to FIGS. 4 through 7.

Figure 12:
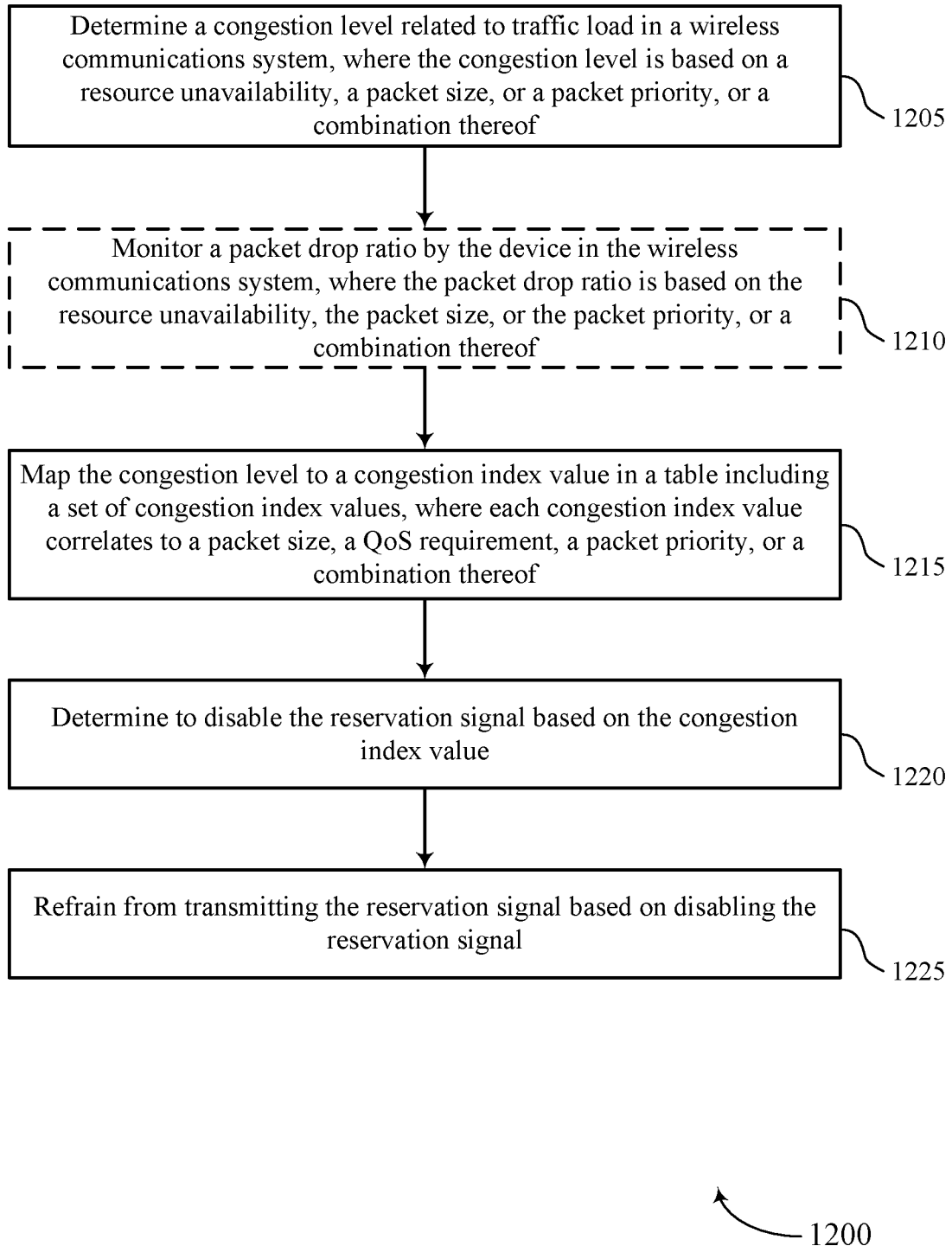

FIG. 12 shows a flowchart illustrating a method 1200 that supports pre-reservation resource management in accordance with one or more aspects of the present disclosure. The operations of method 1200 may be implemented by a device or its components as described herein. For example, the operations of method 1200 may be performed by a communications manager as described with reference to FIGS. 4 through 7. In some examples, a device may execute a set of instructions to control the functional elements of the device to perform the functions described herein. Additionally or alternatively, a device may perform aspects of the functions described herein using special-purpose hardware.

At 1205, the device may determine a congestion level related to traffic load in a wireless communications system, where the congestion level is based on a resource unavailability, a packet size, or a packet priority, or a combination thereof. The operations of 1205 may be performed according to the methods described herein. In some examples, aspects of the operations of 1205 may be performed by a condition component as described with reference to FIGS. 4 through 7.

At 1210, the device may optionally monitor a packet drop ratio by the device in the wireless communications system, where the packet drop ratio is based on the resource unavailability, the packet size, or the packet priority, or a combination thereof. The operations of 1210 may be performed according to the methods described herein. In some examples, aspects of the operations of 1210 may be performed by a condition component as described with reference to FIGS. 4 through 7.

At 1215, the device may map the congestion level to a congestion index value in a table including a set of congestion index values, where each congestion index value correlates to a packet size, a QoS requirement, a packet priority, or a combination thereof. The operations of 1215 may be performed according to the methods described herein. In some examples, aspects of the operations of 1215 may be performed by a mapping component as described with reference to FIGS. 4 through 7.

At 1220, the device may determine to disable the reservation signal based on the congestion index value. The operations of 1220 may be performed according to the methods described herein. In some examples, aspects of the operations of 1220 may be performed by a mapping component as described with reference to FIGS. 4 through 7.

At 1225, the device may refrain from transmitting the reservation signal based on disabling the reservation signal. The operations of 1225 may be performed according to the methods described herein. In some examples, aspects of the operations of 1225 may be performed by a signal component as described with reference to FIGS. 4 through 7.

It should be noted that the methods described herein describe possible implementations, and that the operations may be rearranged or otherwise modified and that other implementations are possible. Further, aspects from two or more of the methods may be combined.

Example 1

A method for wireless communication, comprising: determining a packet for transmission; determining whether to transmit a reservation signal prior to the transmission of the packet based on a condition, the reservation signal reserving resources for the transmission of the packet, and the reservation signal sharing resources from a same resource pool as the resources for the transmission of the packet; and refraining from transmitting the reservation signal based on determining whether to transmit the reservation signal prior to the transmission of the packet.

Example 2

The method of example 1, further comprising: determining a congestion level related to traffic load in the wireless communications system, wherein the congestion level is based on a resource unavailability, a packet size, or a packet priority, or a combination thereof; and monitoring a packet drop ratio by the device in the wireless communications system, wherein the packet drop ratio is based on a resource unavailability, a packet size, or a packet priority, or a combination thereof, wherein refraining from transmitting the reservation signal is based on the congestion level or the packet drop ratio, or a combination thereof.

Example 3

The method of example 2, further comprising: determining that the congestion level or the packet drop ratio, or both, satisfy a threshold; and disabling the transmission of the reservation signal prior to the transmission of the packet based on the congestion level or the packet drop ratio, or both, satisfying the threshold, wherein refraining from transmitting the reservation signal is based on the disabling.

Example 4

A method of wireless communication, comprising: determining whether to transmit a reservation signal prior to a transmission of a packet based on a condition; and allocating, based on the determining, resources for the reservation signal from a same resource pool associated with the transmission of the packet or a dedicated resource pool according to a pre-reservation resource pattern, the reservation signal reserving one or more resources for the transmission of the packet.

Example 5

The method of example 4, further comprising: determining a first set of available resources during a transmission time interval, the first set of available resources following the pre-reservation resource pattern or the first set of available resources being from the dedicated resource pool; and selecting the first set of available resources to transmit the reservation signal during the transmission time interval and prior to the transmission of the packet.

Example 6

The method of any of examples 4 or 5, further comprising: determining a second set of available resource during the transmission time interval or a subsequent transmission time interval; reserving the second set of available resources for the transmission of the packet; and including, in the reservation signal, information associated with the second set of available resources for the transmission of the packet.

Example 7

The method of any of examples 4 to 6, further comprising: determining an absence of available resources during a transmission time interval; determining available resources during a subsequent transmission time interval, the available resources following the pre-reservation resource pattern, and the available resources being from the dedicated resource pool; and selecting the available resources to transmit the reservation signal during the transmission time interval and prior to the transmission of the packet.

Example 8

The method of example 7, further comprising: determining a second set of available resource during the transmission time interval or a subsequent transmission time interval; reserving the second set of available resources for the transmission of the packet; and including, in the reservation signal, information associated with the second set of available resources for the transmission of the packet.

Example 9

The method of any of examples 4 to 8, further comprising: determining a congestion level related to traffic load in the wireless communications system, wherein the congestion level is based at least in part on a resource unavailability, a packet size, or a packet priority, or a combination thereof; and monitoring a packet drop ratio by the device in the wireless communications system, wherein the packet drop ratio is based on the resource unavailability, the packet size, or the packet priority, or a combination thereof.

Example 10

The method of example 9, further comprising: mapping the congestion level to a congestion index value in a table comprising a set of congestion index values, wherein each congestion index value correlates to a packet size, a QoS requirement, a packet priority, or a combination thereof determining to enable the reservation signal based on the congestion index value; and transmitting the reservation signal based on enabling the reservation signal.

Example 11

The method of example 9, further comprising: mapping the congestion level to a congestion index value in a table comprising a set of congestion index values, wherein each congestion index value correlates to a packet size, a QoS requirement, a packet priority, or a combination thereof; determining to disable the reservation signal based on the congestion index value; and refraining from transmitting the reservation signal based on disabling the reservation signal.

Example 12

The method of any of examples 9 to 11, further comprising: determining to perform the transmission of the packet using resources from the dedicated resource pool based on disabling the reservation signal, wherein the dedicated resource pool comprises one or more resources dedicated for pre-reservation associated with the reservation signal.

Example 13

The method of example 9: further comprising: determining that the congestion level or the packet drop ratio, or both, are below a first threshold; and refraining from allocating one or more resources for the transmission of the packet from the dedicated resource pool associated with the reservation signal based on the congestion level or the packet drop ratio, or both, being below the first threshold.

Example 14

The method of example 9: further comprising: determining that the congestion level or the packet drop ratio, or both, are above a first threshold and below a second threshold; and allocating resources for the transmission of the packet from the dedicated resource pool associated with the reservation signal based on the congestion level or the packet drop ratio, or both, being above the first threshold and below the second threshold, wherein the allocated resources are reserved based on a reservation signal or a preceding transmission.

Example 15

The method of example 9, further comprising: determining that the congestion level or the packet drop ratio, or both, are above a first threshold; and allocating resources for the transmission of the packet from the dedicated resource pool associated with the reservation signal based on the congestion level or the packet drop ratio, or both, being above the first threshold.

Example 16

An apparatus for wireless communications comprising a processor, memory coupled to the processor, the processor and memory configured to perform a method of any of examples 1 to 3.

Example 17

An apparatus for wireless communications comprising a processor, memory coupled to the processor, the processor and memory configured to perform a method of any of examples 4 to 15.

Example 18

An apparatus comprising at least one means for performing a method of any of examples 1 to 3.

Example 19

An apparatus comprising at least one means for performing a method of any of examples 4 to 15.

Example 20

A non-transitory computer-readable medium storing code for wireless communications, the code comprising instructions executable by a processor to perform a method of any of examples 1 to 3.

Example 21

A non-transitory computer-readable medium storing code for wireless communications, the code comprising instructions executable by a processor to perform a method of any of examples 4 to 15.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a device in a wireless communications system, comprising:
    receiving an indication of a reservation configuration to transmit a reservation signal according to a condition, the reservation signal reserving resources for a packet from a resource pool configured according to a pre-reservation resource pattern, the reservation signal sharing resources from the resource pool configured according to the pre-reservation resource pattern; and
    refraining from transmitting the reservation signal prior to a transmission of the packet based at least in part on the condition.

2. The method of claim 1, further comprising:
    determining a congestion level related to traffic load in the wireless communications system, wherein the congestion level is based at least in part on a resource unavailability, a packet size, or a packet priority, or a combination thereof; and
    monitoring a packet drop ratio by the device in the wireless communications system, wherein the packet drop ratio is based at least in part on the resource unavailability, the packet size, or the packet priority, or a combination thereof,
    wherein refraining from transmitting the reservation signal is based at least in part on the congestion level or the packet drop ratio, or a combination thereof.

3. The method of claim 2, further comprising:
    disabling the transmission of the reservation signal prior to the transmission of the packet based at least in part on the congestion level or the packet drop ratio, or both, satisfying a threshold, wherein refraining from transmitting the reservation signal is based at least in part on the disabling.

4. A method for wireless communications at a device in a wireless communications system, comprising:
    receiving an indication of a reservation configuration to transmit a reservation signal prior to a transmission of a packet according to a condition; and
    allocating, based at least in part on the condition and the reservation configuration, resources for the reservation signal from a resource pool configured according to a pre-reservation resource pattern, the reservation signal reserving resources for the transmission of the packet.

5. The method of claim 4, further comprising:
    selecting a first set of available resources to transmit the reservation signal during multiple earliest available slots and prior to the transmission of the packet, the first set of available resources following the pre-reservation resource pattern.

6. The method of claim 4, further comprising:
determining a first set of available resources during a transmission time interval, the first set of available resources following the pre-reservation resource pattern; and
selecting the first set of available resources to transmit the reservation signal during the transmission time interval and prior to the transmission of the packet.

7. The method of claim 6, further comprising:
determining a second set of available resources during the transmission time interval or a subsequent transmission time interval;
reserving the second set of available resources for the transmission of the packet; and
including, in the reservation signal, information associated with the second set of available resources for the transmission of the packet.

8. The method of claim 4, further comprising:
determining an absence of available resources during a transmission time interval;
determining available resources during a subsequent transmission time interval, the available resources following the pre-reservation resource pattern, and the available resources being from the resource pool; and
selecting the available resources to transmit the reservation signal during the transmission time interval and prior to the transmission of the packet.

9. The method of claim 8, further comprising:
determining a second set of available resources during the transmission time interval or the subsequent transmission time interval;
reserving the second set of available resources for the transmission of the packet; and
including, in the reservation signal, information associated with the second set of available resources for the transmission of the packet.

10. The method of claim 4, further comprising:
determining a congestion level related to traffic load in the wireless communications system, wherein the congestion level is based at least in part on a resource unavailability, a packet size, or a packet priority, or a combination thereof; and
monitoring a packet drop ratio by the device in the wireless communications system, wherein the packet drop ratio is based at least in part on the resource unavailability, the packet size, or the packet priority, or a combination thereof.

11. The method of claim 10, further comprising:
mapping the congestion level to a congestion index value in a table comprising a set of congestion index values, wherein each congestion index value correlates to the packet size, a Quality-of-Service (QoS) requirement, the packet priority, or a combination thereof;
enabling the reservation signal based at least in part on the congestion index value; and
transmitting the reservation signal based at least in part on enabling the reservation signal.

12. The method of claim 10, further comprising:
mapping the congestion level to a congestion index value in a table comprising a set of congestion index values, wherein each congestion index value correlates to the packet size, a Quality-of-Service (QoS) requirement, the packet priority, or a combination thereof;
disabling the reservation signal based at least in part on the congestion index value; and
refraining from transmitting the reservation signal based at least in part on disabling the reservation signal.

13. The method of claim 12, further comprising:
performing the transmission of the packet using resources from the resource pool based at least in part on disabling the reservation signal, wherein the resource pool comprises one or more resources dedicated for pre-reservation associated with the reservation signal.

14. The method of claim 10, further comprising:
refraining from allocating one or more resources for the transmission of the packet from the resource pool associated with the reservation signal based at least in part on the congestion level or the packet drop ratio, or both, being below a first threshold.

15. The method of claim 10, further comprising:
allocating resources for the transmission of the packet from the resource pool associated with the reservation signal based at least in part on the congestion level or the packet drop ratio, or both, being above a first threshold and below a second threshold, wherein the allocated resources are reserved based at least in part on the reservation signal or a preceding transmission.

16. The method of claim 10, further comprising:
allocating resources for the transmission of the packet from the resource pool associated with the reservation signal based at least in part on the congestion level or the packet drop ratio, or both, being above a first threshold.

17. An apparatus for wireless communication, comprising:
one or more processors; and
one or more memories coupled to the one or more processors, the one or more memories comprising instructions executable by the one or more processors individually or collectively to cause the apparatus to:
receive an indication of a reservation configuration to transmit a reservation signal according to a condition, the reservation signal reserving resources for a packet from a resource pool configured according to a pre-reservation resource pattern, the reservation signal sharing resources from the resource pool configured according to the pre-reservation resource pattern; and
refrain from transmitting the reservation signal prior to a transmission of the packet based at least in part on the condition.

18. The apparatus of claim 17, wherein the one or more processors are further configured individually or collectively to cause the apparatus to:
determine a congestion level related to traffic load in a wireless communications system, wherein the congestion level is based at least in part on a resource unavailability, a packet size, or a packet priority, or a combination thereof; and
monitor a packet drop ratio by a device in the wireless communications system, wherein the packet drop ratio is based at least in part on the resource unavailability, the packet size, or the packet priority, or a combination thereof,
wherein refraining from transmitting the reservation signal is based at least in part on the congestion level or the packet drop ratio, or a combination thereof.

19. The apparatus of claim 18, wherein the one or more processors are further configured individually or collectively to cause the apparatus to:

disable the transmission of the reservation signal prior to the transmission of the packet based at least in part on the congestion level or the packet drop ratio, or both, satisfying a threshold, wherein refraining from transmitting the reservation signal is based at least in part on the disabling.

20. An apparatus for wireless communication, comprising:
one or more processors; and
one or more memories coupled to the one or more processors, the one or more memories comprising instructions executable by the one or more processors individually or collectively to cause the apparatus to:
receive an indication of a reservation configuration to transmit a reservation signal prior to a transmission of a packet according to a condition; and
allocate, based at least in part on the condition and the reservation configuration, resources for the reservation signal from a resource pool configured according to a pre-reservation resource pattern, the reservation signal reserving resources for the transmission of the packet.

21. The apparatus of claim 20, wherein the one or more processors are further configured individually or collectively to cause the apparatus to:
select a first set of available resources to transmit the reservation signal during multiple earliest available slots and prior to the transmission of the packet, the first set of available resources following the pre-reservation resource pattern.

22. The apparatus of claim 20, wherein the one or more processors are further configured individually or collectively to cause the apparatus to:
determine a first set of available resources during a transmission time interval, the first set of available resources following the pre-reservation resource pattern; and
select the first set of available resources to transmit the reservation signal during the transmission time interval and prior to the transmission of the packet.

23. The apparatus of claim 22, wherein the one or more processors are further configured individually or collectively to cause the apparatus to:
determine a second set of available resources during the transmission time interval or a subsequent transmission time interval;
reserve the second set of available resources for the transmission of the packet; and
include, in the reservation signal, information associated with the second set of available resources for the transmission of the packet.

24. The apparatus of claim 20, wherein the one or more processors are further configured individually or collectively to cause the apparatus to:
determine an absence of available resources during a transmission time interval;
determine available resources during a subsequent transmission time interval, the available resources following the pre-reservation resource pattern, and the available resources being from the resource pool; and
select the available resources to transmit the reservation signal during the transmission time interval and prior to the transmission of the packet.

25. The apparatus of claim 24, wherein the one or more processors are further configured individually or collectively to cause the apparatus to:
determine a second set of available resources during the transmission time interval or the subsequent transmission time interval;
reserve the second set of available resources for the transmission of the packet; and
include, in the reservation signal, information associated with the second set of available resources for the transmission of the packet.

26. The apparatus of claim 20, wherein the one or more processors are further configured individually or collectively to cause the apparatus to:
determine a congestion level related to traffic load in a wireless communications system, wherein the congestion level is based at least in part on a resource unavailability, a packet size, or a packet priority, or a combination thereof; and
monitor a packet drop ratio by a device in the wireless communications system, wherein the packet drop ratio is based at least in part on the resource unavailability, the packet size, or the packet priority, or a combination thereof.

27. The apparatus of claim 26, wherein the one or more processors are further configured individually or collectively to cause the apparatus to:
map the congestion level to a congestion index value in a table comprising a set of congestion index values, wherein each congestion index value correlates to the packet size, a Quality-of-Service (QoS) requirement, the packet priority, or a combination thereof;
enable the reservation signal based at least in part on the congestion index value; and
transmit the reservation signal based at least in part on enabling the reservation signal.

28. The apparatus of claim 26, wherein the one or more processors are further configured individually or collectively to cause the apparatus to:
map the congestion level to a congestion index value in a table comprising a set of congestion index values, wherein each congestion index value correlates to the packet size, a Quality-of-Service (QoS) requirement, the packet priority, or a combination thereof;
disable the reservation signal based at least in part on the congestion index value; and
refrain from transmitting the reservation signal based at least in part on disabling the reservation signal.

29. The apparatus of claim 28, wherein the one or more processors are further configured individually or collectively to cause the apparatus to:
perform the transmission of the packet using resources from the resource pool based at least in part on disabling the reservation signal, wherein the resource pool comprises one or more resources dedicated for pre-reservation associated with the reservation signal.

30. The apparatus of claim 26, wherein the one or more processors are further configured individually or collectively to cause the apparatus to:
refrain from allocating one or more resources for the transmission of the packet from the resource pool associated with the reservation signal based at least in part on the congestion level or the packet drop ratio, or both, being below a first threshold.

31. The apparatus of claim 26, wherein the one or more processors are further configured individually or collectively to cause the apparatus to:
allocate resources for the transmission of the packet from the resource pool associated with the reservation signal based at least in part on the congestion level or the packet drop ratio, or both, being above a first threshold and below a second threshold, wherein the allocated resources are reserved based at least in part on the reservation signal or a preceding transmission.

32. The apparatus of claim 26, wherein the one or more processors are further configured individually or collectively to cause the apparatus to:
allocate resources for the transmission of the packet from the resource pool associated with the reservation signal based at least in part on the congestion level or the packet drop ratio, or both, being above a first threshold.

33. An apparatus for wireless communication at a device in a wireless communications system, comprising:
means for receiving an indication of a reservation configuration to transmit a reservation signal according to a condition, the reservation signal reserving resources for a packet from a resource pool configured according to a pre-reservation resource pattern, the reservation signal sharing resources from the resource pool configured according to the pre-reservation resource pattern; and
means for refraining from transmitting the reservation signal prior to a transmission of the packet based at least in part on the condition.

34. An apparatus for wireless communication at a device in a wireless communications system, comprising:
means for receiving an indication of a reservation configuration to transmit a reservation signal prior to a transmission of a packet according to a condition; and
means for allocating, based at least in part on the condition and the reservation configuration, resources for the reservation signal from a resource pool configured according to a pre-reservation resource pattern, the reservation signal reserving resources for the transmission of the packet.

35. The apparatus of claim 34, further comprising:
means for selecting a first set of available resources to transmit the reservation signal during multiple earliest available slots and prior to the transmission of the packet, the first set of available resources following the pre-reservation resource pattern.

36. A non-transitory computer-readable medium storing code for wireless communication at a device in a wireless communications system, the code comprising instructions executable by one or more processors individually or collectively to:
receive an indication of a reservation configuration to transmit a reservation signal according to a condition, the reservation signal reserving resources for a packet from a resource pool configured according to a pre-reservation resource pattern, the reservation signal sharing resources from the resource pool configured according to the pre-reservation resource pattern; and
refrain from transmitting the reservation signal prior to a transmission of the packet based at least in part on the condition.

37. A non-transitory computer-readable medium storing code for wireless communication at a device in a wireless communications system, the code comprising instructions executable by one or more processors individually or collectively to:
receive an indication of a reservation configuration to transmit a reservation signal prior to a transmission of a packet according to a condition; and
allocate, based at least in part on the condition and the reservation configuration, resources for the reservation signal from a resource pool configured according to a pre-reservation resource pattern, the reservation signal reserving resources for the transmission of the packet.

38. The non-transitory computer-readable medium of claim 37, wherein the instructions are further executable by the one or more processors individually or collectively to:
select a first set of available resources to transmit the reservation signal during multiple earliest available slots and prior to the transmission of the packet, the first set of available resources following the pre-reservation resource pattern.

* * * * *